(12) United States Patent
Krishnan et al.

(10) Patent No.: US 9,047,863 B2
(45) Date of Patent: Jun. 2, 2015

(54) SYSTEMS, METHODS, APPARATUS, AND COMPUTER-READABLE MEDIA FOR CRITICALITY THRESHOLD CONTROL

(71) Applicant: Qualcomm Incorporated, San Diego, CA (US)

(72) Inventors: Venkatesh Krishnan, San Diego, CA (US); Daniel J. Sinder, San Diego, CA (US); Vivek Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 13/718,797

(22) Filed: Dec. 18, 2012

(65) Prior Publication Data

US 2013/0185062 A1    Jul. 18, 2013

Related U.S. Application Data

(60) Provisional application No. 61/586,007, filed on Jan. 12, 2012, provisional application No. 61/587,507, filed on Jan. 17, 2012, provisional application No. 61/641,093, filed on May 1, 2012.

(51) Int. Cl.
*G10L 19/005* (2013.01)
*G10L 19/04* (2013.01)
(Continued)

(52) U.S. Cl.
CPC ............ *G10L 19/04* (2013.01); *G10L 19/008* (2013.01); *H04L 1/0009* (2013.01);
(Continued)

(58) Field of Classification Search
USPC ........................................................ 704/219
See application file for complete search history.

(56) References Cited

U.S. PATENT DOCUMENTS

| 5,732,389 A | 3/1998 | Kroon et al. |
| 5,828,676 A | 10/1998 | Hurlbut et al. |

(Continued)

FOREIGN PATENT DOCUMENTS

| EP | 0936772 A2 | 8/1999 |
| EP | 1441532 A2 | 7/2004 |

(Continued)

OTHER PUBLICATIONS

Gandikota V.R., et al., "Adaptive FEC-Based Packet Loss Resilience Scheme for Supporting Voice Communication over Ad hoc Wireless Networks", IEEE Transactions on Mobile Computing, IEEE Service Center, Los Alamitos, CA, US, vol. 7, No. 10, Oct. 1, 2008, pp. 1184-1199, XP011335279, ISSN: 1536-1233, DOI: 10.1109/TMC. 2008.42.

(Continued)

*Primary Examiner* — Susan McFadden
(74) *Attorney, Agent, or Firm* — Austin Rapp & Hardman

(57) ABSTRACT

A method of audio signal processing is described. The method includes calculating a criticality measure based on information about a first frame of the audio signal. The method also includes calculating a threshold value based on information relating to a state of a transmission channel. The method further includes comparing the calculated criticality measure to the calculated threshold value. The method additionally includes deciding to transmit a redundant copy of the first frame based on a result of the comparison. The method also includes transmitting the redundant copy of the first frame with a second frame. The first frame precedes the second frame in the audio signal.

52 Claims, 20 Drawing Sheets

(51) Int. Cl.
*G10L 19/008* (2013.01)
*H04L 1/00* (2006.01)
*H04L 1/08* (2006.01)
*G10L 19/107* (2013.01)
*G10L 19/09* (2013.01)

(52) U.S. Cl.
CPC ............. *H04L 1/0014* (2013.01); *H04L 1/007* (2013.01); *H04L 1/08* (2013.01); *G10L 19/005* (2013.01); *G10L 19/107* (2013.01); *G10L 19/09* (2013.01)

(56) References Cited

U.S. PATENT DOCUMENTS

| | | | |
|---|---|---|---|
| 6,445,686 | B1 | 9/2002 | Hoffbeck et al. |
| 7,546,508 | B2 | 6/2009 | Greer |
| 7,590,237 | B2 * | 9/2009 | Krause et al. ................... 380/37 |
| 7,944,470 | B2 | 5/2011 | Foster et al. |
| 8,255,207 | B2 | 8/2012 | Vaillancourt et al. |
| 2005/0267743 | A1 | 12/2005 | Gerlach |
| 2008/0077410 | A1 | 3/2008 | Ojala et al. |
| 2009/0170499 | A1 | 7/2009 | Vaeisaenen et al. |
| 2010/0312552 | A1 | 12/2010 | Zheng et al. |
| 2013/0185084 | A1 | 7/2013 | Rajendran et al. |

FOREIGN PATENT DOCUMENTS

| | | |
|---|---|---|
| TW | 200838128 A | 9/2008 |
| TW | 201146026 A | 12/2011 |

OTHER PUBLICATIONS

International Search Report and Written Opinion—PCT/US2012/070721—ISA/EPO—Mar. 20, 2013.

Mullner R. et al., "Exploiting AMR-WB Audio Bandwidth Extension for Quality and Capacity Increase", Mobile and Wireless Communications Summit, 2007. 16th IST, Jul. 1-5, 2007, pp. 1-7.

Rubino G., et al., "Evaluating the utility of media-dependent FEC in VoiP flows", Quality of Service in the Emerging Networking Panorama. Fifth International Workshop on Quality of Future Internet Services, QofiS 2004. First Workshop on Quality of Service Routing, WQoSR 2004. Fourth International Workshop on Internet Charging and, Oct. 1, 2004, pp. 31-43, XP055055283, Berlin, Germany ISBN: 978-3-54-023238-4 Retrieved from the Internet: URL:http://www.irisa.fr/armor/lesmembres/Rubino/Para ev/QQA/fec.pdf [retrieved on Mar. 5, 2013].

Sanneck H. et al., "Packet Loss Recovery and Control for Voice Transmission over the Internet", Berlin, 2000, pp. 223, Source: http://sanneck.net/research/publications/thesis/Sann0010_Loss.pdf.

Taiwan Search Report—TW101148840—TIPO—Oct. 19, 2014.

* cited by examiner

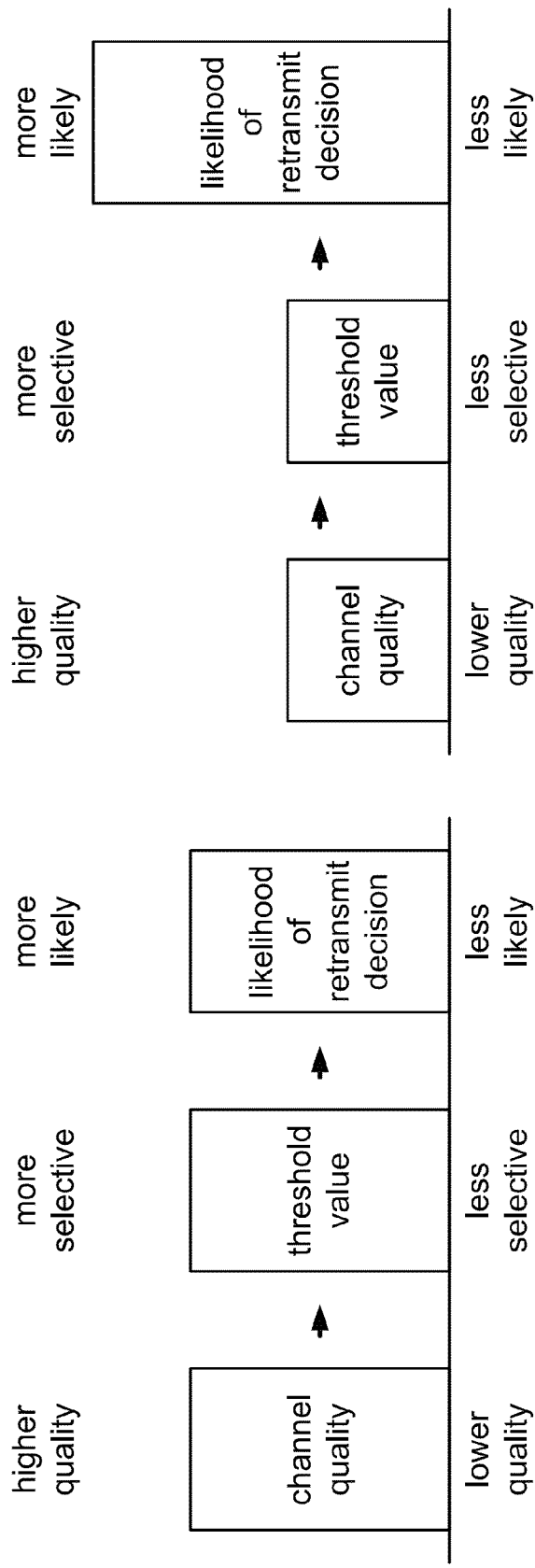
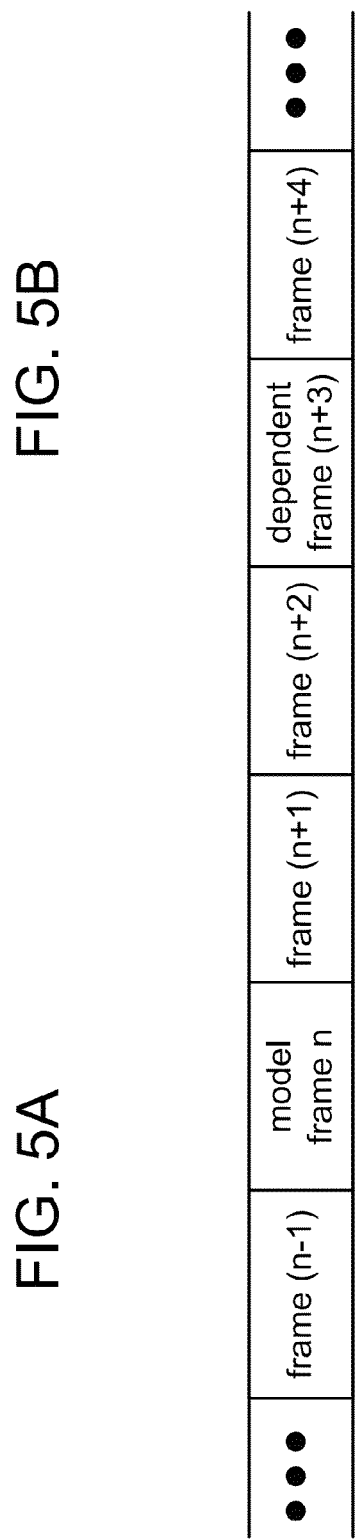
FIG. 5A
FIG. 5B
FIG. 5C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| CMR=1 |1| FT=0  |1|0| FT=1  |1|p(0)                           |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                        p(131)|r(0)                            |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|      r(176)|P|P|P|                                            |
+-+-+-+-+-+-+-+-+-+-+-+-+-+-+-+-+-+-+-+-+-+-+-+-+-+-+-+-+-+-+-+-+
```

FIG. 10

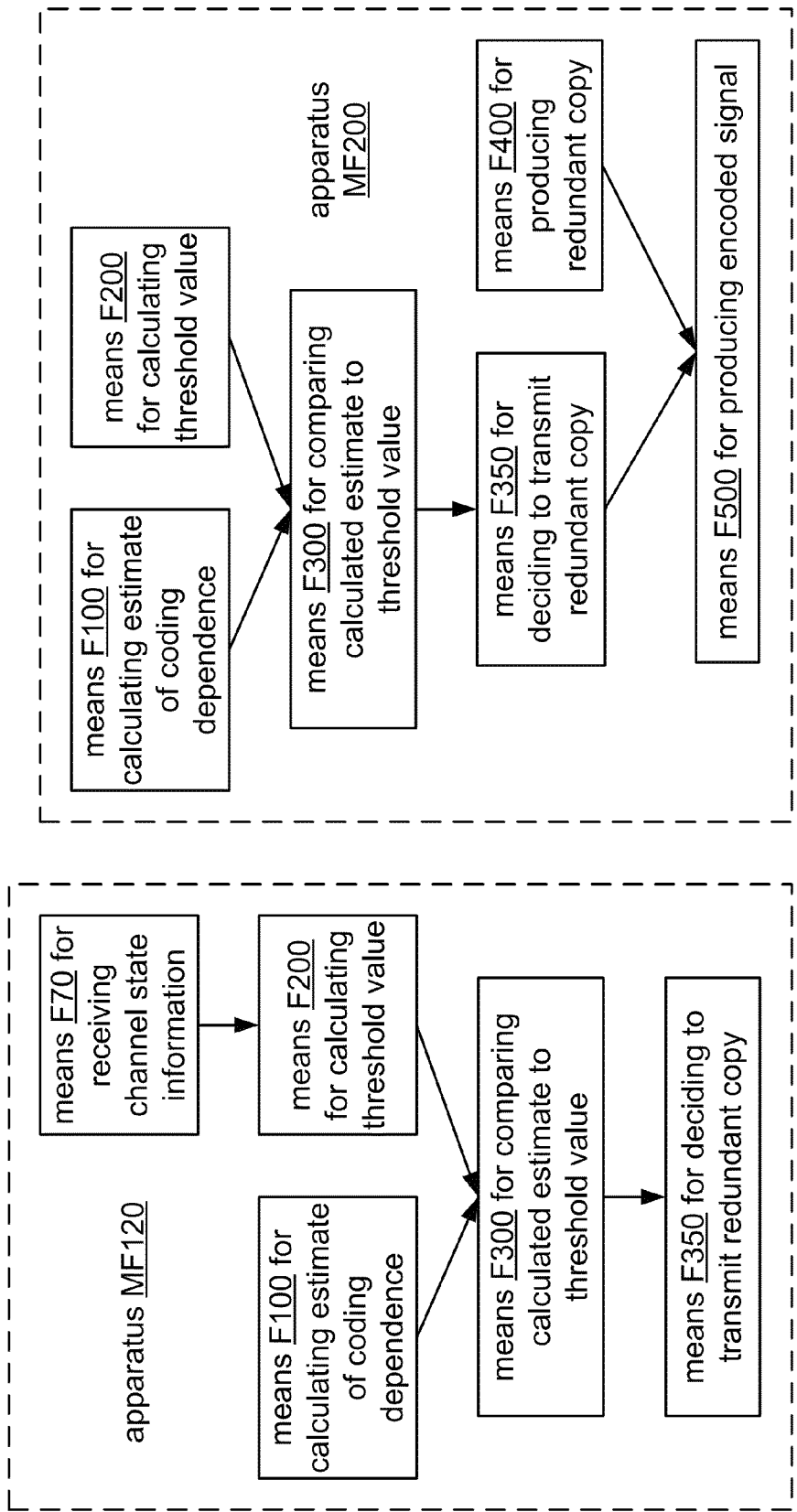

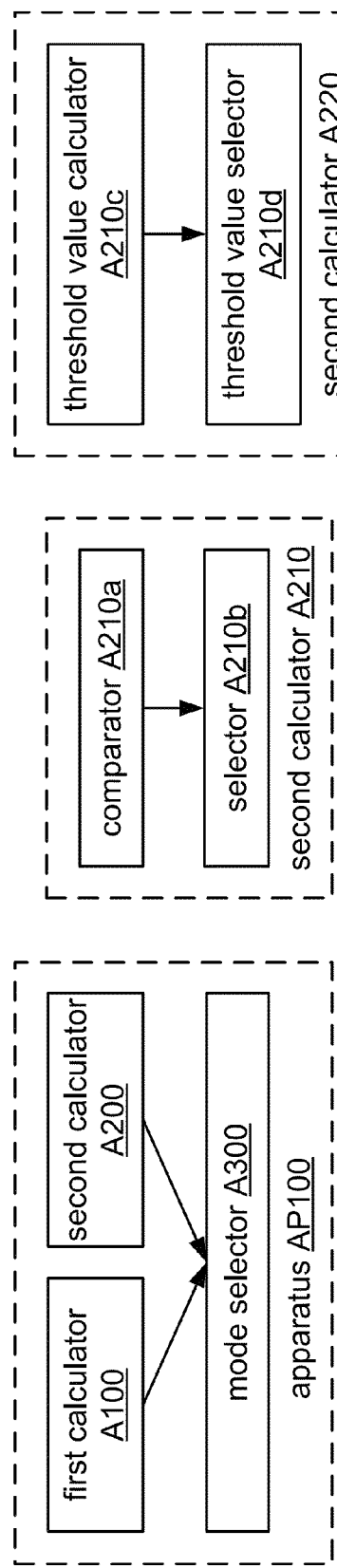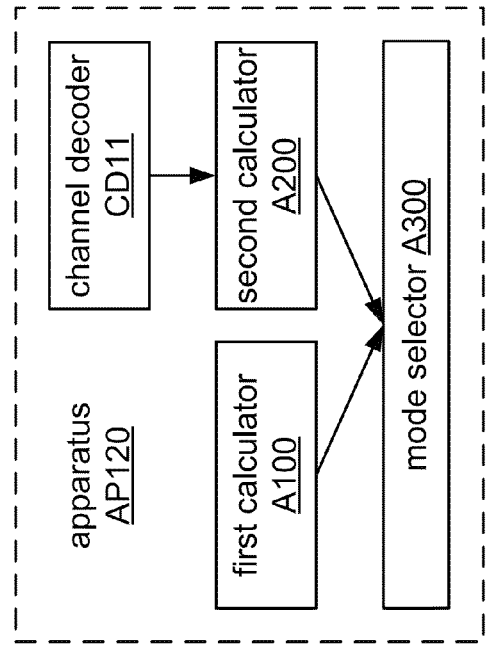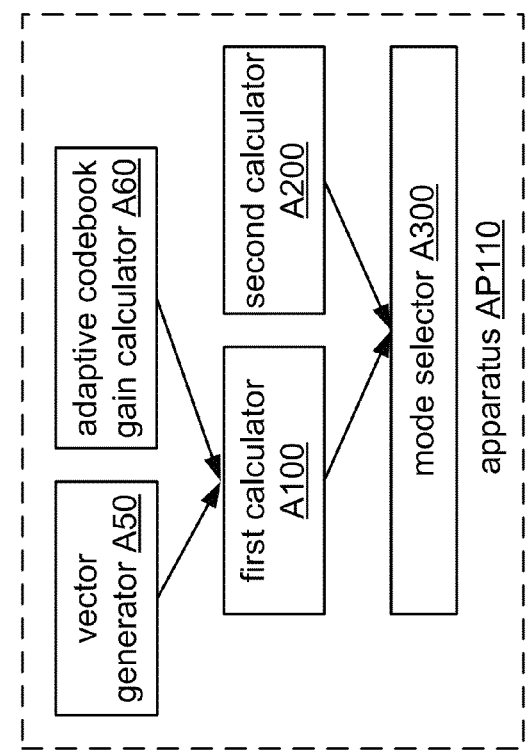

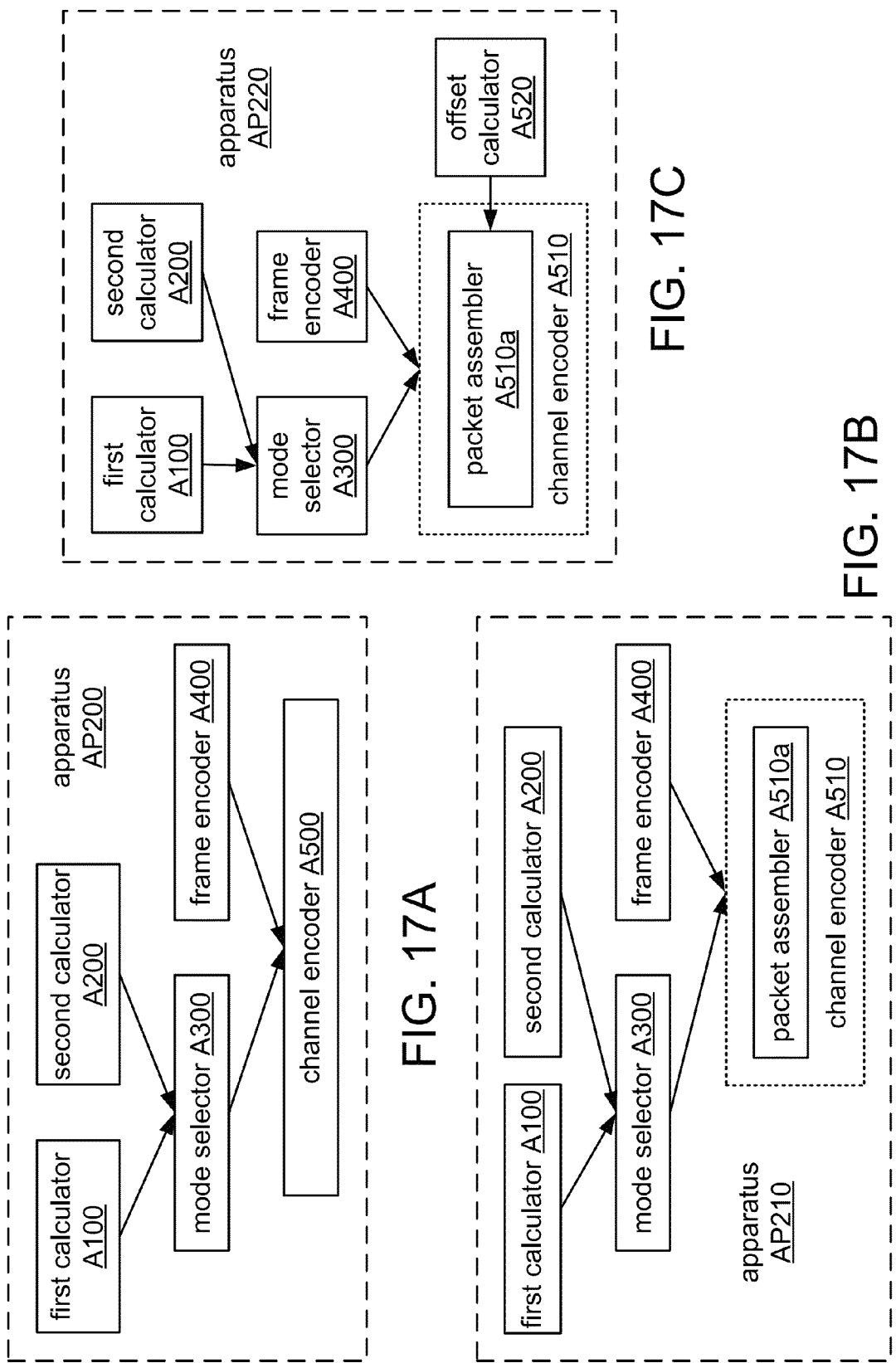

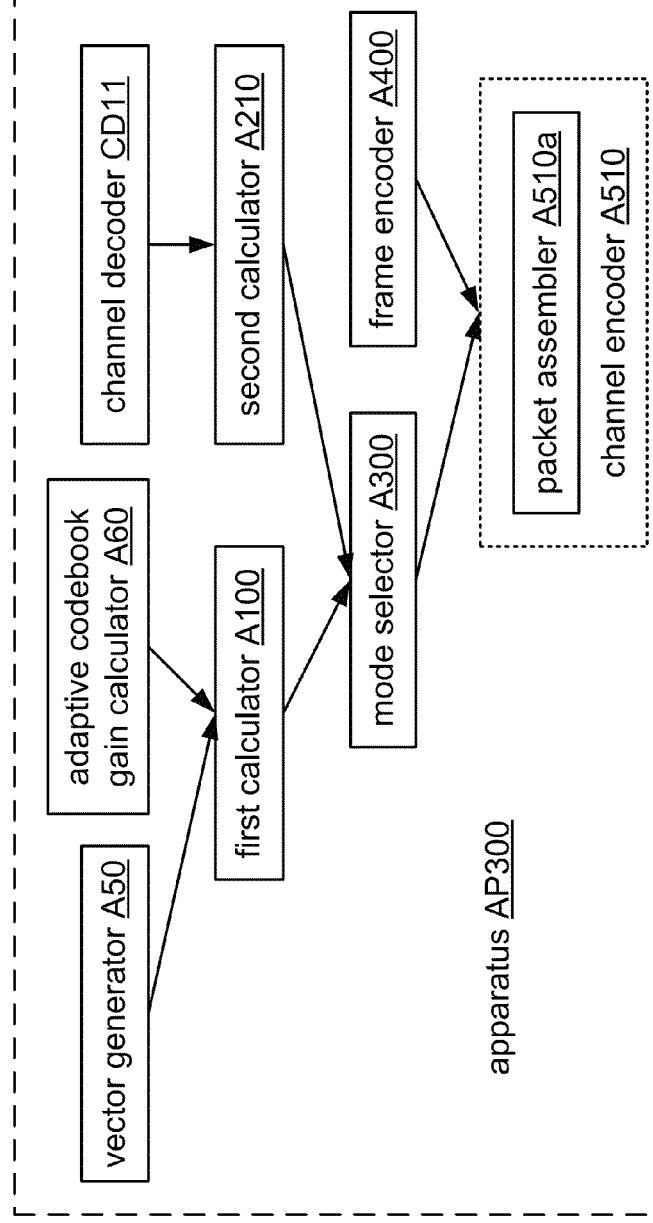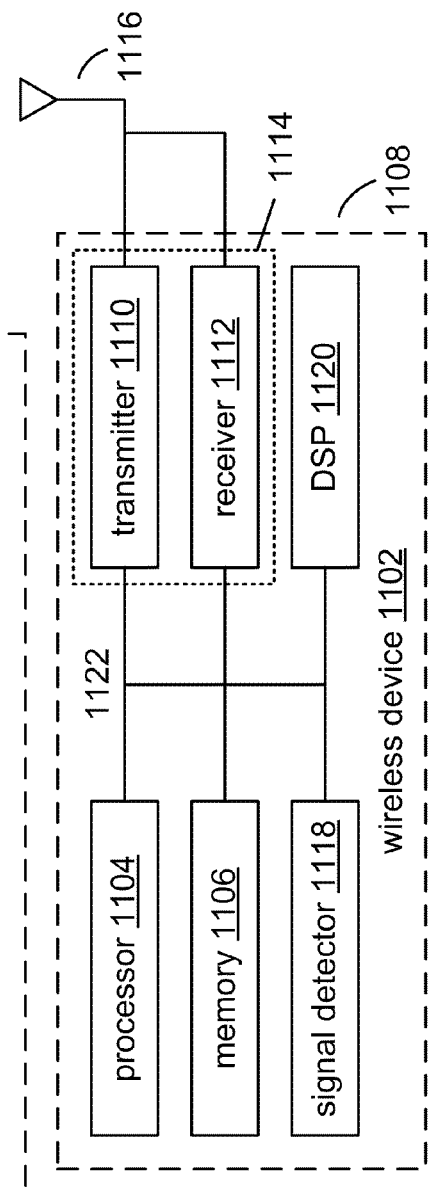

SYSTEMS, METHODS, APPARATUS, AND COMPUTER-READABLE MEDIA FOR CRITICALITY THRESHOLD CONTROL

CLAIM OF PRIORITY UNDER 35 U.S.C. §119

The present application for Patent claims priority to Provisional Application No. 61/586,007, entitled "SYSTEMS, METHODS, APPARATUS, AND COMPUTER-READABLE MEDIA FOR BIT ALLOCATION FOR REDUNDANT TRANSMISSION" filed Jan. 12, 2012, and assigned to the assignee hereof. The present application for patent also claims priority to Provisional Application No. 61/587,507, entitled "SYSTEMS, METHODS, APPARATUS, AND COMPUTER-READABLE MEDIA FOR CRITICALITY THRESHOLD CONTROL," filed Jan. 17, 2012, and assigned to the assignee hereof. The present application for patent also claims priority to Provisional Application No. 61/641,093 entitled "SYSTEMS, METHODS, APPARATUS, AND COMPUTER-READABLE MEDIA FOR BIT ALLOCATION FOR REDUNDANT TRANSMISSION," filed May 1, 2012, and assigned to the assignee hereof.

BACKGROUND

1. Field

This disclosure relates to audio communications.

2. Background

Digital audio telecommunications have been performed over circuit-switched networks. A circuit-switched network is a network in which a physical path is established between two terminals for the duration of a call. In circuit-switched applications, a transmitting terminal sends a sequence of packets containing audio (e.g., voice) information over the physical path to the receiving terminal. The receiving terminal uses the audio information contained in the packets (e.g., voice information) to synthesize the corresponding audio signal (e.g., a speech signal).

Digital audio telecommunications have started to be performed over packet-switched networks. A packet-switched network is a network in which the packets are routed through the network based on a destination address. With packet-switched communications, routers determine a path for each packet individually, sending it down any available path to reach its destination. As a result, the packets may not arrive at the receiving terminal at the same time or in the same order. A de-jitter buffer may be used in the receiving terminal to put the packets back in order and play them out in a continuous sequential fashion.

On some occasions, a packet is lost in transit from the transmitting terminal to the receiving terminal. A lost packet may degrade the quality of the synthesized audio signal. As such, benefits may be realized by providing systems and methods to address a loss of information within a frame (e.g., within a speech frame).

SUMMARY

A method of audio signal processing according to a general configuration includes calculating an estimate of coding dependence of a second frame of an audio signal on a first frame that precedes the second frame in the audio signal. This method also includes calculating a threshold value, based on information relating to a state of a transmission channel. This method also includes comparing the calculated estimate to the calculated threshold value; and deciding to transmit a redundant copy of the first frame, based on a result of said comparing. Computer-readable storage media (e.g., non-transitory media) having tangible features that cause a machine reading the features to perform such a method are also disclosed.

An apparatus for audio signal processing according to a general configuration includes means for calculating an estimate of coding dependence of a second frame of an audio signal on a first frame that precedes the second frame in the audio signal. This apparatus also includes means for calculating a threshold value, based on information relating to a state of a transmission channel; means for comparing the calculated estimate to the calculated threshold value; and means for deciding to transmit, based on a result of said comparing, a redundant copy of the first frame.

An apparatus for audio signal processing according to another general configuration includes a first calculator configured to calculate an estimate of coding dependence of a second frame of an audio signal on a first frame that precedes the second frame in the audio signal. This apparatus also includes a second calculator configured to calculate a threshold value, based on information relating to a state of a transmission channel. This apparatus also includes a mode selector configured (A) to compare the calculated estimate to the calculated threshold value and (B) to decide, based on a result of said comparing, to transmit a redundant copy of the first frame.

BRIEF DESCRIPTION OF THE DRAWINGS

FIGS. 5A and 5B show examples of relations between channel state information and other system parameters as described herein.

FIG. 5C shows an example of a sequence of frames of an audio signal.

FIG. 10 shows an example of a payload for an RTP packet.

FIG. 13A shows a block diagram of an implementation MF120 of apparatus MF100.

FIG. 13B shows a block diagram of an implementation MF200 of apparatus MF100.

FIG. 16A shows a block diagram of an apparatus AP100 according to a general configuration.

FIG. 16B shows a block diagram of an implementation AP110 of apparatus AP100.

FIG. 16C shows a block diagram of an implementation A210 of second calculator A200.

FIG. 16D shows a block diagram of an implementation AP120 of apparatus AP100.

FIG. 16E shows a block diagram of an example A220 of an implementation of second calculator A200.

FIG. 17A shows a block diagram of an implementation AP200 of apparatus AP100.

FIG. 17B shows a block diagram of an implementation AP210 of apparatus AP100.

FIG. 17C shows a block diagram of an implementation AP220 of apparatus AP210.

FIG. 18A shows a block diagram of an implementation AP300 of apparatus AP110, AP120, and AP210.

FIG. 18B shows a block diagram of a wireless device 1102.

DETAILED DESCRIPTION

Figure 1:
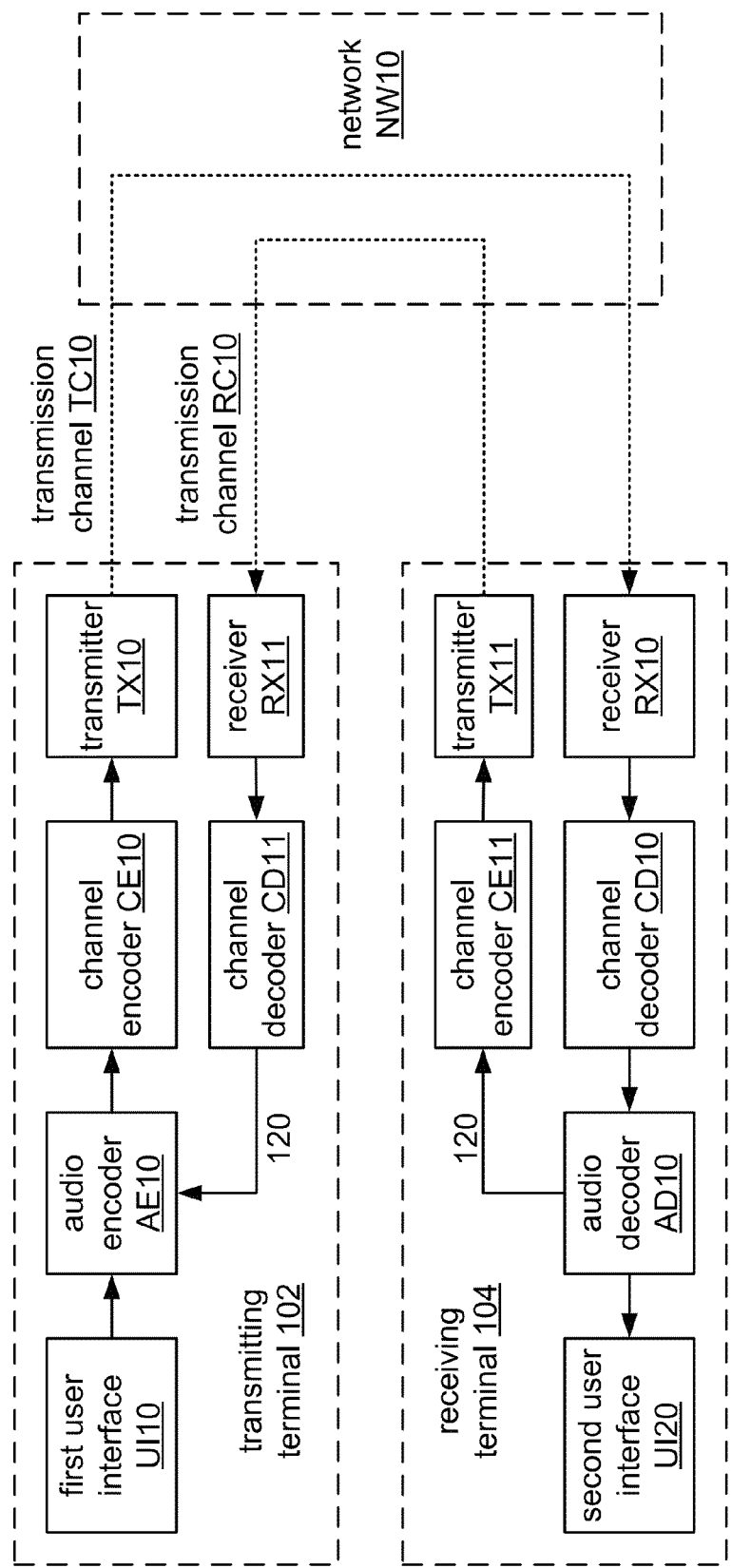
FIG. 1 is a block diagram illustrating an example of a transmitting terminal 102 and a receiving terminal 104 in communication via a network NW10.

Systems, methods, and apparatus as disclosed herein may be implemented to adjust one or more criticality threshold values based on channel conditions, for speech coding applications in which the threshold values are used to control retransmission frequency of speech frames.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C" and "one or more of A, B, and C" indicate "A and/or B and/or C."

Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency-domain representation of the signal (e.g., as produced by a fast Fourier transform or MDCT) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." The term "plurality" means "two or more." Any incorporation by reference of a portion of a document shall also be understood to incorporate definitions of terms or variables that are referenced within the portion, where such definitions appear elsewhere in the document, as well as any figures referenced in the incorporated portion.

Unless otherwise indicated, the terms "codec," "vocoder," "audio coder," and "speech coder" refer to the combination of an audio encoder and a corresponding audio decoder. Unless otherwise indicated, the term "coding" indicates transfer of an audio signal via a codec, including encoding and subsequent decoding. Unless otherwise indicated, the term "transmitting" indicates propagating (e.g., a signal) into a transmission channel.

A coding scheme as described herein may be applied to code any audio signal (e.g., including non-speech audio). Alternatively, it may be desirable to use such a coding scheme only for speech. In such case, the coding scheme may be used with a classification scheme to determine the type of content of each frame of the audio signal and select a suitable coding scheme.

A coding scheme as described herein may be used as a primary codec or as a layer or stage in a multi-layer or multi-stage codec. In one such example, such a coding scheme is used to code a portion of the frequency content of an audio signal (e.g., a lowband or a highband), and another coding scheme is used to code another portion of the frequency content of the signal. In another such example, such a coding scheme is used to code an audio signal that is a residual (i.e., an error between the original and encoded signals) of another coding layer, such as a residual of a linear prediction coding (LPC) analysis operation.

Methods, systems, and apparatus as described herein may be configured to process the audio signal as a series of segments. Typical segment lengths range from about five or ten milliseconds to about forty or fifty milliseconds, and the segments may be overlapping (e.g., with adjacent segments overlapping by 25% or 50%) or nonoverlapping. In one particular example, the audio signal is divided into a series of nonoverlapping segments or "frames", each having a length of ten milliseconds. In another particular example, each frame has a length of twenty milliseconds. Examples of sampling rates for the audio signal include (without limitation) eight, twelve, sixteen, 32, 44.1, 48, and 192 kilohertz.

Audio telecommunications applications may be implemented in a packet-switched network. For example, audio telecommunications applications may be implemented in a Voice over Internet Protocol (VoIP) network. A packet may include one or more frames of the encoded audio signal, and packets with audio (e.g., voice) information may be transmitted from a first device to a second device on the network. However, some of the packets may be lost during the transmission of the packets. For example, the loss of multiple packets (sometimes referred to as bursty packet loss) may be a reason for the degradation of perceived speech quality at a receiving device.

In order to alleviate the degradation of the perceived speech quality caused by packet losses in a VoIP network, there exist two types of solutions. The first solution is a receiver-based packet loss concealment (PLC) approach. A PLC method may be used to mask the effects of packet loss in VoIP communications. For example, a PLC method may be implemented to create a substitute packet instead of the one that was lost during transmission. Such a PLC method may attempt to create a packet as similar as possible to the one that was lost. Receiver-based PLC methods may not need any additional resources or help from the sender in order to create the substitute packet. When important speech frames are lost, however, a PLC method may be ineffective at masking effects of the packet loss.

The second solution is a sender-based packet loss resilient approach. Such an approach includes forward error correction (FEC) methods, which may include sending some additional data with each packet. The additional data may be used to restore errors caused by the loss of data during the transmission. For example, FEC schemes may transmit redundant audio frames. In other words, more than one copy (typically two) of an audio frame is transmitted by the sender. These two frames may be referred to as a primary copy and a redundant copy.

Although sender-based packet loss resilient schemes may improve the perceptual quality of the decoded speech, these schemes may also increase the bandwidth used during transmission of the speech. Traditional FEC schemes may also increase the end-to-end delay, which may be intolerable for real-time conversations. For example, conventional sender-based schemes send the same speech frame twice at two different time periods. This approach may at least double the data rate. Some conventional schemes may use a low-bit rate codec for the redundant copy in order to reduce the data rate. However, the use of a low-bit rate codec may increase the complexity at the encoder. In addition, some conventional schemes may use the same low-bit rate codec for both the primary copy of the frame and the redundant copy of the frame. Although this approach may reduce the complexity at the encoder as well as reduce the data rate, the baseline speech quality (i.e., the speech quality when no frames are lost) may be greatly reduced. Further, conventional sender-based schemes typically operate under the assumption of an additional delay of at least one frame interval.

Systems, methods, and apparatus as described herein may be implemented to provide a source- and channel-controlled FEC scheme in order to obtain an optimal trade-off between speech quality, delay, and data rate. The FEC scheme may be configured such that no additional delay is introduced. High quality improvement of the speech quality under moderate data rate increases may be achieved. An FEC scheme as described herein may also operate at any target data rate. In one example, the FEC scheme and a target data rate may be adaptively adjusted based on the condition of a transmission channel as well as external controls. The proposed FEC scheme may also be implemented to be compatible with legacy communication devices (e.g., legacy handsets).

For some codecs for audio (e.g., voice) communications, the total number of bits used to encode each frame is a predetermined constant. Examples of such codecs include the Adaptive Multi Rate (AMR) speech codec (e.g., as described in 3GPP Technical Specification (TS) 26.071, version 11.0.0, September 2012, available from European Telecommunications Standards Institute (ETSI), www-dot-etsi-dot-org, Sophia Antipolis, FR) and the AMR Wideband speech codec (e.g., as described in ITU-T Recommendation G.722.2, July 2003, International Telecommunication Union, www-dot-itu-dot-int, and/or 3GPP Technical Specification 26.190 v11.0.0 (September 2012), available from ETSI), in which the number of bits is determined by the coding mode selected for the frame. In such cases, transmitting a redundant copy of a past frame may require a corresponding reduction in the number of bits available for coding the signal information in the current frame. This reduction may have a negative impact on the perceptual quality of the decoded speech.

It may be desirable to implement a flexible approach in which redundant copies are transmitted only for critical frames. A "critical frame" is a frame whose loss is expected to have a significant impact on the perceptual quality of the decoded signal. Moreover, it may be desirable to transmit such a redundant copy only if the impact of piggybacking the redundant copy on the present frame is expected to be minimal. For a fixed-bit-rate system, it may be desirable to determine a number of bits to be used for coding the current frame so that the total of the number of bits used for coding the current frame and the number of bits used for coding a redundant copy (e.g., a partial copy) of the past frame meets a target fixed bit rate T.

FIG. 1 is a block diagram illustrating an example of a transmitting terminal 102 and a receiving terminal 104 that communicate over a network NW10 via transmission channels TC10 and RC10. Each of terminals 102 and 104 may be implemented to perform a method as described herein and/or to include an apparatus as described herein. The transmitting and receiving terminals 102, 104 may be any devices that are capable of supporting voice communications including telephones (e.g., smartphones), computers, audio broadcast and receiving equipment, video conferencing equipment, or the like. The transmitting and receiving terminals 102, 104 may be implemented, for example, with wireless multiple access technology, such as Code Division Multiple Access (CDMA) capability. CDMA is a modulation and multiple-access scheme based on spread-spectrum communications.

Transmitting terminal 102 includes an audio encoder AE10, and receiving terminal 104 includes an audio decoder AD10. Audio encoder AE10 may be used to compress audio information (e.g., speech) from a first user interface UI10 (e.g., a microphone and audio front-end) by extracting values of parameters according to a model of human speech generation. A channel encoder CE10 assembles the parameter values into packets, and a transmitter TX10 transmits the packets including these parameter values over network NW10, which may include a packet-based network, such as the Internet or a corporate intranet, via transmission channel TC10. Transmission channel TC10 may be a wired and/or wireless transmission channel and may be considered to extend to an entry point of network NW10 (e.g., a base station controller), to another entity within network NW10 (e.g., a channel quality analyzer), and/or to a receiver RX10 of receiving terminal 104, depending upon how and where the quality of the channel is determined.

A receiver RX10 of receiving terminal 104 is used to receive the packets from network NW10 via a transmission channel. A channel decoder CD10 decodes the packets to obtain the parameter values, and an audio decoder AD10 synthesizes the audio information using the parameter values from the packets. The synthesized audio (e.g., speech) is provided to a second user interface UI20 (e.g., an audio output stage and loudspeaker) on the receiving terminal 104. Although not shown, various signal processing functions may be performed in channel encoder CE10 and channel decoder CD10 (e.g., convolutional coding including cyclic redundancy check (CRC) functions, interleaving) and in transmitter TX10 and receiver RX10 (e.g., digital modulation and corresponding demodulation, spread spectrum processing, analog-to-digital and digital-to-analog conversion).

Each party to a communication may transmit as well as receive, and each terminal may include instances of audio encoder AE10 and decoder AD10. The audio encoder and decoder may be separate devices or integrated into a single device known as a "voice coder" or "vocoder." As shown in FIG. 1, the terminals 102, 104 are described with an audio encoder AE10 at one terminal of network NW10 and an audio decoder AD10 at the other.

In at least one configuration of transmitting terminal 102, an audio signal (e.g., speech) may be input from first user interface UI10 to audio encoder AE10 in frames, with each frame further partitioned into sub-frames. Such arbitrary frame boundaries may be used where some block processing is performed. However, such partitioning of the audio samples into frames (and sub-frames) may be omitted if continuous processing rather than block processing is implemented. In the described examples, each packet transmitted across network NW10 may include one or more frames depending on the specific application and the overall design constraints.

Audio encoder AE10 may be a variable-rate or single-fixed-rate encoder. A variable-rate encoder may dynamically switch between multiple encoder modes (e.g., different fixed rates) from frame to frame, depending on the audio content (e.g., depending on whether speech is present and/or what type of speech is present). Audio decoder AD10 may also dynamically switch between corresponding decoder modes from frame to frame in a corresponding manner. A particular mode may be chosen for each frame to achieve the lowest bit rate available while maintaining acceptable signal reproduction quality at receiving terminal 104.

Receiving terminal 104 may also feed channel state information 120 back to transmitting terminal 102. In one such example, receiving terminal 104 is configured to collect information relating to the quality of the transmission channel that carries the packets from transmitting terminal 102. Receiving terminal 104 may use the collected information to estimate the quality of the channel. The collected information and/or the channel quality estimate may then be fed back to transmitting terminal 102 as channel state information 120. As shown in FIG. 1, for example, an instance CE11 of channel encoder CE10 may assemble the collected information and/or quality estimate (e.g., from audio decoder AD10) into a packet for transmission via an instance TX11 of transmitter TX10 and transmission channel RC10 back to transmitting terminal 102, where the packet is received by an instance RX11 of receiver RX10 and disassembled by an instance CD11 of channel decoder CD10, and the information and/or estimate is provided to audio encoder AE10. Transmitting terminal 102 (e.g., audio encoder AE10) may use the channel state information 120 to adapt one or more functions (e.g., a criticality threshold) that are associated with a sender-based packet-loss-resilient scheme as described herein.

Figure 2A:
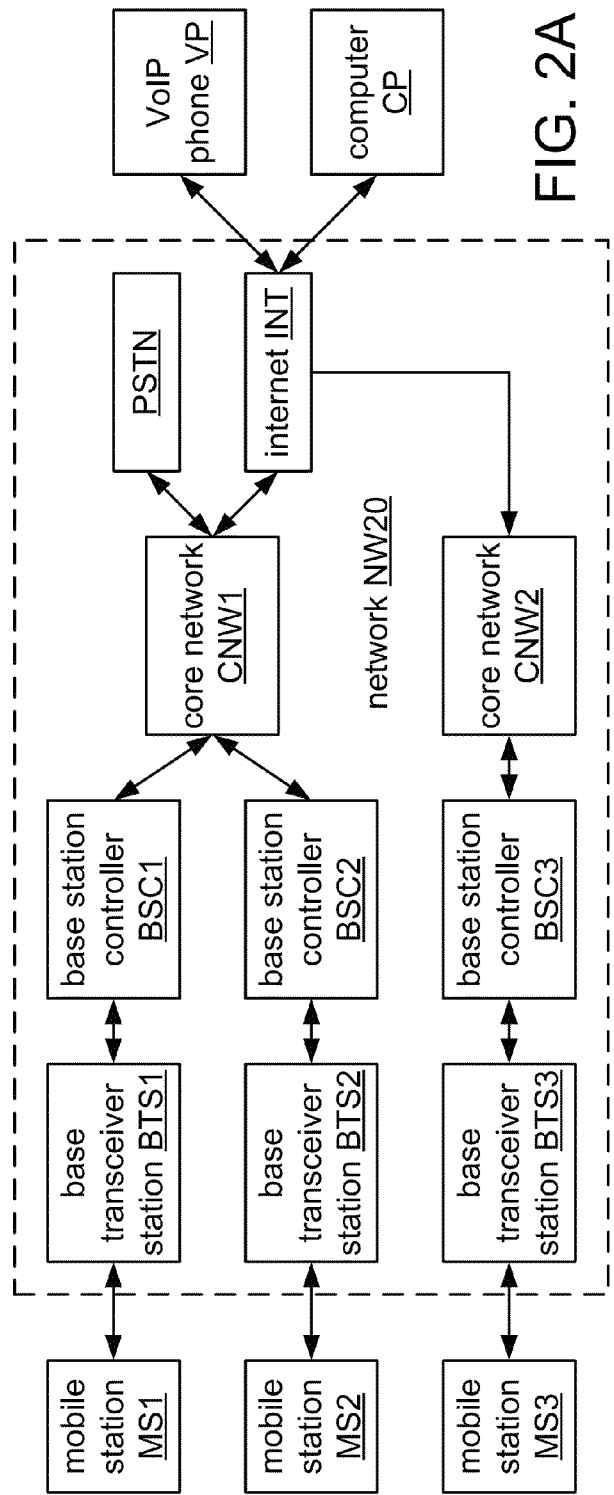
FIG. 2A shows a block diagram of an implementation NW20 of network NW10 with various terminal devices.

FIG. 2A shows an example of an implementation NW20 of network NW10 that includes base transceiver stations BTS1-BTS3, which communicate with mobile stations over radio uplink and downlink transmission channels. Network NW20 also includes core network CNW1, which is connected to the public switched telephone network PSTN and the Internet INT, and core network CNW2, which is also connected to the Internet INT. Network NW20 also includes base station controllers BSC1-BSC3 that interface the transceiver stations with the core networks. Network NW20 may be implemented to provide packet-switched communications between terminal devices. Core network CNW1 may also provide circuit-switched communications between terminal devices MS1 and MS2 via base transceiver stations BTS1, BTS2 and/or between such a terminal device and a terminal device on the PSTN.

FIG. 2A also shows examples of different terminal devices that may communicate with one another (e.g., over a packet-switched communications link) via network NW20: mobile stations MS1-MS3; Voice over IP (VoIP) telephone VP; and computer CP, which is configured to execute a telecommunications program (e.g., Skype software from Microsoft Skype Division, LU)). Any of the terminal devices MS1-MS3, VP, and CP may be implemented to include an instance of transmitting terminal 102 and an instance of receiving terminal 104. Mobile devices MS1-MS3 communicate with the network via wireless radio uplink and downlink transmission channels. Terminals VP and CP communicate with the network via wired transmission channels (e.g., Ethernet cable) and/or wireless transmission channels (e.g., an IEEE 802.11 or "WiFi" link). Network NW20 may also include intermediate entities, such as gateways and/or TRAUs (Transcoder and Rate Adapter Units).

Audio encoder AE10 typically processes the input signal as a series of nonoverlapping segments in time or "frames," with a new encoded frame being calculated for each frame. The frame period is generally a period over which the signal may be expected to be locally stationary; common examples include twenty milliseconds (equivalent to 320 samples at a sampling rate of 16 kHz, 256 samples at a sampling rate of 12.8 kHz, or 160 samples at a sampling rate of eight kHz) and ten milliseconds. It is also possible to implement audio encoder AE10 to process the input signal as a series of overlapping frames.

Figure 2B:
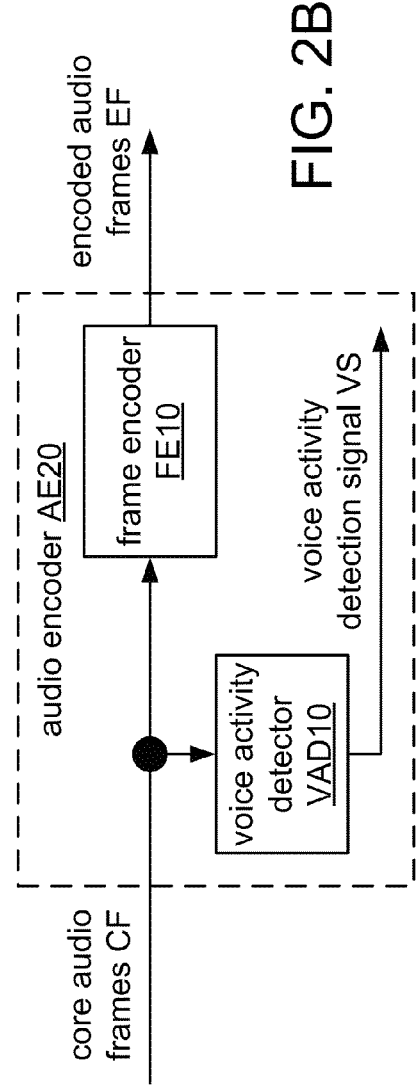
FIG. 2B shows a block diagram of an implementation AE20 of audio encoder AE10.

FIG. 2B shows a block diagram of an implementation AE20 of audio encoder AE10 that includes a frame encoder FE10. Frame encoder FE10 is configured to encode each of a sequence of frames CF of the input signal ("core audio frames") to produce a corresponding one of a sequence of encoded audio frames EF. Audio encoder AE10 may also be implemented to perform additional tasks such as dividing the input signal into the frames and selecting a coding mode for frame encoder FE10 (e.g., selecting a reallocation of an initial bit allocation, as described herein with reference to task T400). Selecting a coding mode (e.g., rate control) may include performing voice activity detection (VAD) and/or otherwise classifying the audio content of the frame. In this example, audio encoder AE20 also includes a voice activity detector VAD10 that is configured to process the core audio frames CF to produce a voice activity detection signal VS (e.g., as described in 3GPP TS 26.194 v11.0.0, September 2012, available at ETSI).

Frame encoder FE10 is typically implemented according to a source-filter model that encodes each frame of the input audio signal as (A) a set of parameters that describe a filter and (B) an excitation signal that will be used at the decoder to drive the described filter to produce a synthesized reproduction of the audio frame. The spectral envelope of a speech signal is typically characterized by peaks that represent resonances of the vocal tract (e.g., the throat and mouth) and are called formants. Most speech coders encode at least this coarse spectral structure as a set of parameters, such as filter coefficients. The remaining residual signal may be modeled as a source (e.g., as produced by the vocal chords) that drives the filter to produce the speech signal and typically is characterized by its intensity and pitch.

Frame encoder FE10 is typically implemented to perform a codebook-based scheme (e.g., codebook excitation linear prediction or CELP) and/or a prototype waveform interpolation (PWI) scheme (e.g., prototype pitch period or PPP), although frame encoder FE10 may also be implemented to perform other schemes (e.g., sinusoidal speech coding and/or transform-based coding). Particular examples of encoding schemes that may be used by frame encoder FE10 to produce the encoded frames EF include, without limitation, G.726, G.728, G.729A, AMR, AMR-WB, AMR-WB+ (e.g., as described in 3GPP TS 26.290 v11.0.0, September 2012 (available from ETSI)), VMR-WB (e.g., as described in the Third Generation Partnership Project 2 (3GPP2) document C.S0052-A v1.0, April 2005 (available online at www-dot-3gpp2-dot-org)), the Enhanced Variable Rate Codec (EVRC, as described in the 3GPP2 document C.S0014-E v1.0, December 2011 (available online at www-dot-3gpp2-dot-org)), the Selectable Mode Vocoder speech codec (as described in the 3GPP2 document C.S0030-0,v3.0, January 2004 (available online at www-dot-3gpp2-dot-org)), and the Enhanced Voice Service codec (EVS, e.g., as described in 3GPP TR 22.813 v10.0.0 (March 2010), available from ETSI).

Figure 3:
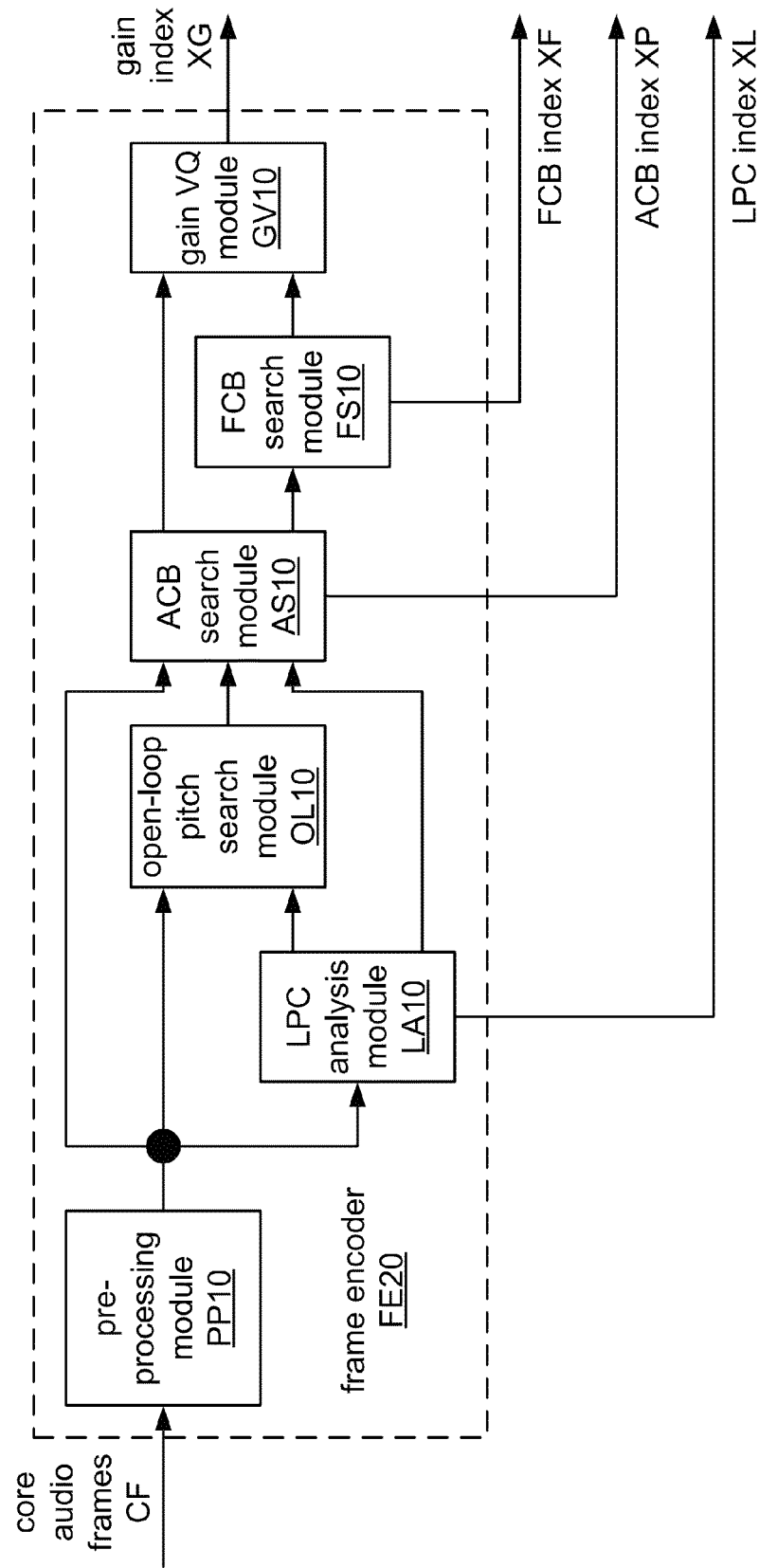
FIG. 3 is a block diagram of an implementation FE20 of frame encoder FE10.

FIG. 3 shows a block diagram of a basic implementation FE20 of frame encoder FE10 that includes a preprocessing module PP10, a linear prediction coding (LPC) analysis module LA10, an open-loop pitch search module OL10, an adaptive codebook (ACB) search module AS10, a fixed codebook (FCB) search module FS10, and a gain vector quantization (VQ) module GV10. Preprocessing module PP10 may be implemented, for example, as described in section 5.1 of 3GPP TS 26.190 v11.0.0. In one such example, preprocessing module PP10 is implemented to perform downsampling of the core audio frame (e.g., from 16 kHz to 12.8 kHz), high-pass filtering of the downsampled frame (e.g., with a cutoff frequency of 50 Hz), and pre-emphasis of the filtered frame (e.g., using a first-order highpass filter).

Linear prediction coding (LPC) analysis module LA10 encodes the spectral envelope of each core audio frame as a set of linear prediction (LP) coefficients (e.g., coefficients of an all-pole filter $1/A(z)$). In one example, LPC analysis module LA10 is configured to calculate a set of sixteen LP filter coefficients to characterize the formant structure of each 20-millisecond frame. Analysis module LA10 may be implemented, for example, as described in section 5.2 of 3GPP TS 26.190 v11.0.0.

Analysis module LA10 may be configured to analyze the samples of each frame directly, or the samples may be weighted first according to a windowing function (for example, a Hamming window). The analysis may also be performed over a window that is larger than the frame, such as a 30-msec window. This window may be symmetric (e.g. 5-20-5, such that it includes the 5 milliseconds immediately before and after the 20-millisecond frame) or asymmetric (e.g. 10-20, such that it includes the last 10 milliseconds of the preceding frame). An LPC analysis module is typically configured to calculate the LP filter coefficients using a Levinson-Durbin recursion or the Leroux-Gueguen algorithm. Although LPC encoding is well suited to speech, it may also be used to encode generic audio signals (e.g., including non-speech, such as music). In another implementation, the analysis module may be configured to calculate a set of cepstral coefficients for each frame instead of a set of LP filter coefficients.

Linear prediction filter coefficients are typically difficult to quantize efficiently and are usually mapped into another representation, such as line spectral pairs (LSPs) or line spectral frequencies (LSFs), or immittance spectral pairs (ISPs) or immittance spectral frequencies (ISFs), for quantization and/or entropy encoding. In one example, analysis module LA10 transforms the set of LP filter coefficients into a corresponding set of ISFs. Other one-to-one representations of LP filter coefficients include parcor coefficients and log-area-ratio values. Typically a transform between a set of LP filter coefficients and a corresponding set of LSFs, LSPs, ISFs, or ISPs is reversible, but embodiments also include implementations of analysis module LA10 in which the transform is not reversible without error.

Analysis module LA10 is configured to quantize the set of ISFs (or LSFs or other coefficient representation), and frame encoder PL20 is configured to output the result of this quantization as LPC index XL. Such a quantizer typically includes a vector quantizer that encodes the input vector as an index to a corresponding vector entry in a table or codebook.

Frame encoder FE20 also includes an optional open-loop pitch search module OL10 that may be used to simplify pitch analysis and reduce the scope of the closed-loop pitch search in adaptive codebook search module AS10. Module OL10 may be implemented to filter the input signal through a weighting filter that is based on the unquantized LP filter coefficients, to decimate the weighted signal by two, and to produce a pitch estimate once or twice per frame (depending on the current rate). Module OL10 may be implemented, for example, as described in section 5.4 of 3GPP TS 26.190 v11.0.0.

Adaptive codebook (ACB) search module AS10 is configured to search the adaptive codebook (based on the past excitation and also called the "pitch codebook") to produce the delay and gain of the pitch filter. Module AS10 may be implemented to perform closed-loop pitch search around the open-loop pitch estimates on a subframe basis on a target signal (as obtained, e.g., by filtering the LP residual through a weighted synthesis filter based on the quantized and unquantized LP filter coefficients) and then to compute the adaptive codevector by interpolating the past excitation at the indicated fractional pitch lag and to compute the ACB gain. Module AS10 may also be implemented to use the LP residual to extend the past excitation buffer to simplify the closed-loop pitch search (especially for delays less than the subframe size of 64 samples). Module AS10 may be implemented to produce an ACB gain (e.g., for each subframe) and a quantized index that indicates the pitch delay of the first subframe (or the pitch delays of the first and third subframes, depending on the current rate) and relative pitch delays of the other subframes. Module AS10 may be implemented, for example, as described in section 5.7 of 3GPP TS 26.190 v11.0.0.

Fixed codebook (FCB) search module FS10 is configured to produce an index that indicates a vector of the fixed codebook (also called "innovation codebook," "innovative codebook," "stochastic codebook," or "algebraic codebook"), which represents the portion of the excitation that is not modeled by the adaptive codevector. Module FS10 may be implemented to produce the codebook index as a codeword that contains all of the information needed to reproduce the FCB vector (e.g., represents the pulse positions and signs), such that no codebook is needed. Module FS10 may be implemented, for example, as described in section 5.8 of 3GPP TS 26.190 v11.0.0.

Gain vector quantization module GV10 is configured to quantize the FCB and ACB gains, which may include gains for each subframe. Module GV10 may be implemented, for example, as described in section 5.9 of 3GPP TS 26.190 v11.0.0

As an alternative to a codebook-based approach, a transform-based approach may be used to encode the LPC residual signal. For example, a modified discrete cosine transform (MDCT) may be used to encode the residual into parameters that include a set of MDCT coefficients, as in the Calliope superwideband codec (QUALCOMM Inc., San Diego, Calif.) and the TCX option of the AMR-WB+ codec. In another example, a transform-based approach is used to encode an audio signal without performing LPC analysis.

It may be desirable to perform a real-time voice communication between a terminal A (e.g., a transmitting user equipment or UE, such as terminal 102) and a terminal B (e.g., a receiving UE, such as terminal 104) over one or more packet-switched networks. Previous solutions, such as AMR and AMR-WB, adapt to bad channel conditions by reducing the bit rate (also called "rate adaptation"). For next-generation codecs for use in VoIP (Voice over Internet Protocol), reduction in bit rate may not help to reduce congestion in networks significantly (e.g., due to RTP overheads, where RTP is the Real-time Transport Protocol as described in, e.g., RFC 3550, Standard 64 (July 2003), Internet Engineering Task Force (IETF)). A method as disclosed herein may impart greater robustness to the vocoder and/or resolve codec performance issues due to channel impairment.

The quality of the transmission channel from transmitting terminal A to receiving terminal B can be estimated by one or more entities in the network (e.g., by a base transceiver station at the network end of the uplink radio channel, by a traffic analyzer in the core network, etc.) and/or by receiving terminal B (e.g., by analyzing the packet loss rate). It may be desirable for receiving terminal B and/or one or more such entities to convey such channel state information 120 back to the transmitting UE using in-band messaging, through control signals (e.g., control packets using RTP Control Protocol (RTCP) as described in, e.g., RFC 1889 (January 1996, IETF)), and/or via another quality-of-service (QoS) feedback mechanism. Transmitting terminal A may be implemented to apply such information by switching to a mode of operation (i.e., a "channel-aware" mode) that is optimized for good performance under impaired channels. Also, the transmitting UE may be configured to select a channel-aware mode of operation at the call set-up time, if bad channel conditions can be anticipated (e.g., unmanaged networks).

A vocoder may be implemented to switch to a "channel-impairment robust mode" in response to an indication of bad channel conditions (e.g., packet errors, high jitter, etc.). In the "channel-impairment robust mode," the speech codec can choose to retransmit certain critical frames of the input signal either partially or entirely. For example, a speech coder operating in a "channel-impairment robust mode" may be configured to transmit a redundant copy of a frame if the criticality of the frame exceeds a certain pre-determined threshold. The criticality of a specific frame may be determined as a function of the perceptual impact of the loss of that frame on the decoded speech, as estimated at the encoder. A channel-aware codec may be configured to switch between a channel-impairment robust mode and a normal mode of operation (i.e., in which no redundant copies are sent) in response to an indication of channel state.

Systems, methods, and apparatus as disclosed herein may be implemented to set a threshold for the retransmission decision as a function of a channel quality estimate. This threshold may be used, for example, to determine whether a frame is critical with respect to the coding of a subsequent frame of the audio signal. For very good channels, the threshold may be set very high. As the channel quality degrades, the threshold may be lowered so that more frames are deemed critical.

Figure 4B:
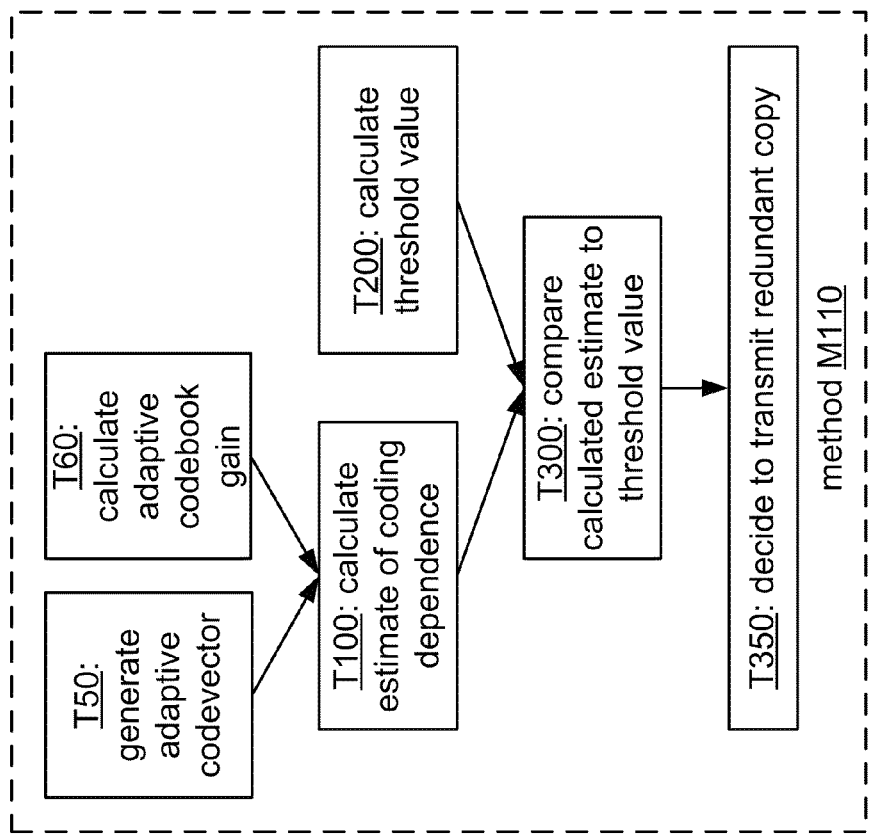
FIG. 4B shows a flowchart of an implementation M110 of method M100.
Figure 4A:
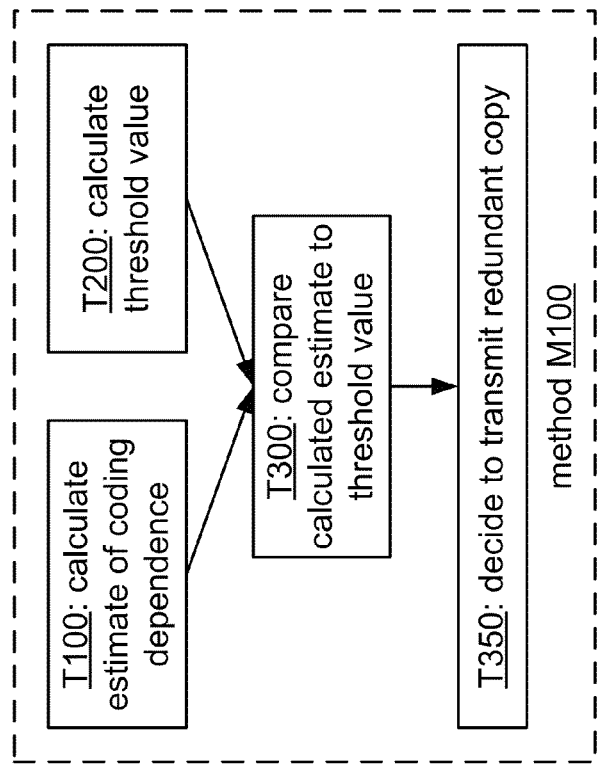
FIG. 4A shows a flowchart of a method M100 according to a general configuration.

FIG. 4A shows a flowchart for a method of processing an audio signal M100 according to a general configuration that includes tasks T100, T200, T300, and T350. Task T100 calculates an estimate of coding dependence of a second frame of the audio signal (the "dependent" frame) on a first frame (the "model" frame, potentially a "critical" frame) that precedes the second frame in the audio signal. Task T200 calculates a threshold value, based on information relating to a state of a transmission channel. Task T300 compares the calculated estimate to the calculated threshold value. Based on a result of the comparing in task T300, task T350 decides to transmit a redundant copy of the first frame. Deciding to transmit the redundant frame may include indicating that the first frame is a critical frame. In some cases, method M100 may be implemented such that no additional encoding delay is required to determine whether or not to retransmit a frame.

It may be desirable to reduce the likelihood that the dependent frame will also be a critical frame (i.e., critical to another frame that is subsequent to it). Typically this likelihood is highest for the frame that immediately follows the model frame and then decreases rapidly for subsequent frames. For voiced speech, it is typical that the onset frame in a talk spurt is critical and that the frame which immediately follows it is also critical (e.g., to cover the case when the onset frame is lost). However, it is also possible for another frame in a talk spurt to be critical (e.g., for a case in which the pitch lag drifts).

A frame offset k may be used to indicate the distance between the model frame and the dependent frame. In one such example, the value of frame offset k is the difference in frame number between the model frame n and the dependent frame (n+k) (e.g., one more than the number of intervening frames). FIG. 5C shows a typical example in which the value of k is three. In another example, the value of k is four. Other possible values include one, two, three, five, and integers greater than five.

Method M100 may be implemented such that the offset k is fixed (e.g., during system implementation or during call set-up). The value of k may be selected according to the length of a frame (e.g. in milliseconds) in the original time-domain signal and a maximum allowable delay. For example, the value of k may be constrained by a maximum allowable value (e.g., to limit frame delay). It may be desirable for the maximum allowable delay to have a value of eighty or one hundred milliseconds. In such case, k may have a maximum value of four or five for a scheme using twenty-millisecond frames, or a maximum value of eight, nine, or ten for a scheme using ten-millisecond frames.

The value of offset k may also be selected and/or updated during a call according to channel conditions (e.g., as indicated by feedback from a receiver). For example, it may be desirable to use a higher value of k in an environment that is causing a frequent loss of consecutive frames (e.g., due to long fades).

Task T100 may be implemented to calculate the estimate of coding dependence of the dependent frame on the model frame (also called a "criticality measure") based on one or more criteria ranging from general characterizations of the model and/or dependent frames to specific loss impact assessments. Such an estimate may be based on information within the model and/or dependent frames and may also be based on information from one or more frames that are adjacent to the model frame in the input signal.

A critical frame may be a frame that, when lost, may cause a significant quality degradation. Different model frames may have different levels of criticalness. For example, for two model frames n1 and n2, if frame (n1+1) (i.e., the frame next to frame n1) is highly predictable from frame n1 and frame (n2+1) (i.e., the frame next to frame n2) doesn't quite depend on frame n2, then frame n1 may be more critical than frame n2, because losing frame n1 may cause quality degradation over more than one frame.

Task T100 may be implemented to calculate the estimate of coding dependence based on an indication of the coding type of the model frame (i.e., the coding process to be used to encode the frame) and possibly of the dependent frame and/or of each of one or more frames adjacent to the model frame. Examples of such a coding type may include code excited linear prediction (CELP), noise excited linear prediction (NELP), prototype waveform interpolation (PWI) or prototype pitch period (PPP), etc. Under this criterion, for example, a CELP model frame may be considered to be more critical than a NELP model frame.

Additionally or alternatively, task T100 may be implemented to calculate the estimate of coding dependence based on a speech mode of the model frame (i.e., a classification of the speech content of the frame) and possibly of the dependent frame and/or of each of one or more frames adjacent to the model frame. Examples of speech mode may include voiced, unvoiced, silence, and transient. A classification of "voiced" may be further divided into onset and stationary. A classification of transient may be further divided into on-transient and off-transient. Under this criterion, for example, a voice onset frame (an initial frame in a talk spurt) may be more critical than a stationary voiced frame, as the encoding of subsequent frames in the talk spurt may rely heavily on information in the onset frame. In one example, task T100 is implemented to calculate the estimate of coding dependence to indicate a high degree of dependence in response to an indication that the model frame is a speech onset frame and the dependent frame is a stationary voiced frame.

Additionally or alternatively, task T100 may be configured to calculate the estimate of coding dependence based on one or more other properties of the model frame (and possibly of the dependent frame and/or of each of one or more frames adjacent to the model frame). For example, if the values of some important parameters for a model frame differ significantly (e.g., more than some predetermined threshold) from the corresponding values for the preceding frame, then the model frame may be a critical frame since it may be not easily predicted from the frame that precedes it, and loss of the model frame may adversely affect subsequent frames that are more similar to the model frame than to the preceding frame.

One example of such a property is an adaptive codebook (ACB) gain. A low ACB gain value for the model frame may indicate that the frame differs significantly from the frame that precedes it, while a high ACB gain value for the dependent frame may indicate that the frame is very dependent on the model frame. FIG. 4B shows a flowchart of an implementation M110 of method M100 that includes tasks T50 and T60. Task T50 uses information from the model frame (e.g., an excitation signal) to generate an adaptive codevector for the dependent frame, and task T60 calculates an ACB gain value for an encoded version of the dependent frame. In this example, task T100 is implemented to calculate the estimate of coding dependence based on at least the calculated ACB gain value.

Another example of such a property is a perceptually weighted SNR (signal-to-noise ratio), which may be expressed in this case as $$C_n = \frac{\sum_{i=0}^{L-1} c_i^2}{\sum_{i=0}^{L-1} e_i^2},$$

where L is the frame length in samples, c is the perceptually weighted signal obtained by filtering the decoded version of model frame n with a perceptual weighting filter W(z), and e is a perceptually weighted error. Error e may be calculated, for example, as a difference between (A) a W(z)-filtered decoded version of model frame n and (B) a W(z)-filtered error-concealed version of model frame n (i.e., assuming the frame is not available at the decoder). The error-concealed version may be calculated based on information from previous frames according to a frame error concealment algorithm. For example, the error-concealed version may be calculated according to the procedure described in 3GPP TS 26.091, v.11.0.0 (September 2012, "Error concealment of lost frames," available from ETSI). In one example, W(z)=A(z/γ) H(z), where $$A(z) = 1 + \sum_{i=1}^{p} a_i z^{-i},$$

$a_1$ to $a_p$ are the LPC filter coefficients for model frame n, γ=0.92, and H(z)=1/(1−0.68 $z^{-1}$). In an alternative example, error e is calculated by applying the filter W(z) to the difference between the decoded and error-concealed versions.

Additionally or alternatively, task T100 may be configured to calculate the estimate of coding dependence as an estimate of an impact of the loss of the model frame on the coding quality of one or more subsequent frames (e.g., the dependent frame). For example, the criticality measure may be based on information from an encoded version of the dependent frame and possibly of one or more other frames subsequent to the model frame (e.g., the adaptive codebook gain of the model frame and/or of one or more of the subsequent frames). Additionally or alternatively, such a measure may be based on information of a decoded version of the dependent frame and possibly of each of one or more other frames subsequent to the model frame (e.g., a perceptually weighted SNR of the decoded version), where the dependent and/or other subsequent frame was encoded without using information of the model frame.

One example of such a measure for a dependent frame (n+k) relative to model frame n may be expressed as $$C_{n:n+k} = \frac{\sum_{i=0}^{L-1} c_i^2}{\sum_{i=0}^{L-1} e_i^2},$$

where L is the frame length in samples, c is the perceptually weighted signal obtained by filtering the decoded version of dependent frame (n+k) with a perceptual weighting filter W(z), and e is a perceptually weighted error. Error e may be calculated in this case, for example, as a difference between (A) a W(z)-filtered decoded version of dependent frame (n+k) without loss of model frame n and (B) a W(z)-filtered decoded version of frame (n+k) assuming an error-concealed version of model frame n. The filter W(z) may be calculated as described above using the LPC filter coefficients for dependent frame (n+k). In an alternative example, error e is calculated by applying the filter W(z) to the difference between the normally decoded and decoded-assuming-loss versions of dependent frame (n+k).

Figure 6B:
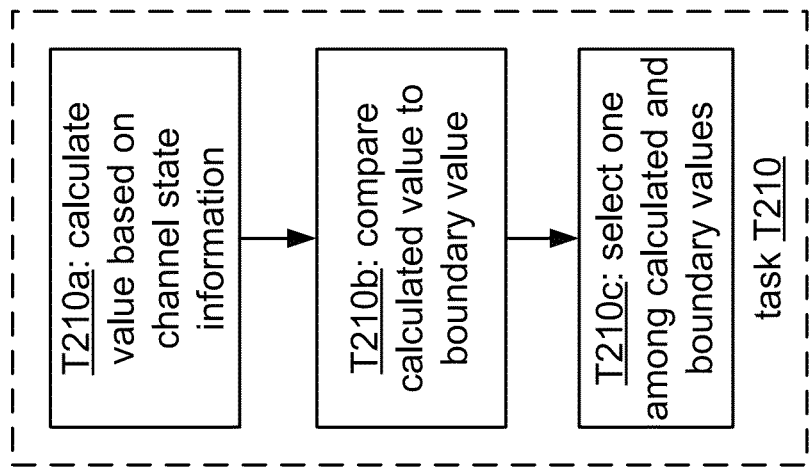
FIG. 6B shows a flowchart of an implementation T210 of task T200.
Figure 6A:
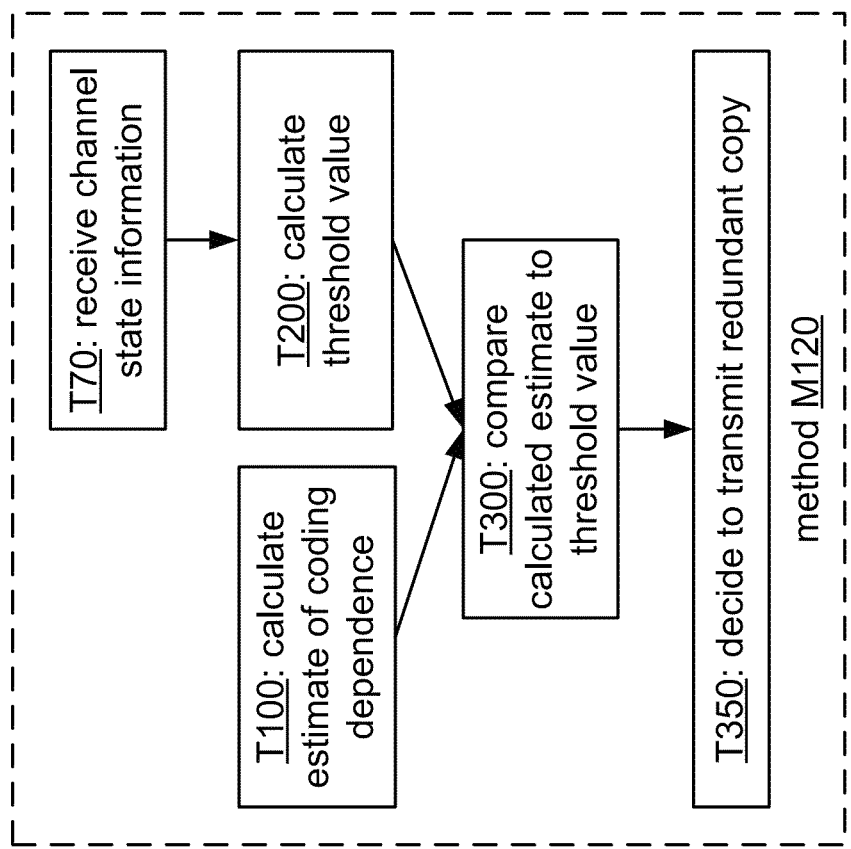
FIG. 6A shows a flowchart of an implementation M120 of method M100.

The information that task T200 uses to calculate the threshold may include one or more of the following measures, which may be updated for each of a series of time intervals: packet loss rate, packet loss fraction, number of packets expected, loss rate per second, received packet count, loss estimate validity (e.g., a weight measure based on a measure of the sample size, such as the number of packets expected for the interval), apparent throughput, and jitter. As noted above, a receiver and/or other entity in the network (e.g., along the transmission channel) may be configured to convey such channel state information 120 back to the transmitting UE using in-band messaging, through control signals (RTCP messaging is an example of one such control signaling method), and/or via another quality-of-service (QoS) feedback mechanism. Examples of information that may be provided via RTCP messaging (Real-Time Transport Control Protocol, as defined in, e.g., the IETF specification RFC 3550) include transmitted octet counts, transmitted packet counts, expected packet counts, number and/or fraction of packets lost, jitter (e.g., variation in delay), and round-trip delay. FIG. 6A shows a flowchart of an implementation M120 of method M100 that includes task T70, which receives channel state information as described herein.

Task T200 may also be configured to calculate more than one threshold, based on information 120 relating to a state of the transmission channel. In such case, decision task T300 may be configured to use information from the frame (and/or one or more adjacent frames) to select the appropriate updated threshold. For example, it may be desirable to use one criticality threshold to determine whether to retransmit a frame that is determined to contain speech, and another criticality threshold to determine whether to retransmit a frame that is determined to contain noise. In another example, different thresholds are used for transitional (e.g., onset) and stationary speech frames, and/or for voiced speech and unvoiced speech frames. For a case in which more than one criticality threshold is used, task T200 may be configured to select, from among two or more criticality measures, a criticality measure that corresponds to the threshold to be used for the model frame.

T300 is configured to compare the calculated estimate to the calculated threshold value. Task T350 decides whether to transmit a redundant copy of the model frame, based on a result of the comparison. For example, task T300 may be implemented to decide to retransmit when the calculated estimate exceeds (alternatively, is not less than) the calculated threshold value.

Method M100 may be implemented such that task T350 (and possibly task T100 and/or T200) are performed only when the dependent frame is an active speech frame. Alternatively, method M100 may be implemented to consider non-speech frames as potentially critical frames. Typically, in two-way conversations, each party speaks for sometime during which a communication system transmits the party's speech (e.g., less than half of the time) and pauses for other times during which the communication system transmits silence or background noise. Infrequent transmission or discontinuous transmission (DTX) during the silence (or background noise) period has little impact on the perceptual quality of the conversation but provides the benefits of reducing inter-/inter-cell interference (therefore potentially increasing the system capacity) and conserving the battery power of a mobile unit used for the conversation.

A typical DTX scheme is realized by a speech encoder that uses voice activity detection (VAD). Using VAD, the encoder can distinguish active speech from background noise. The encoder encodes each active speech segment (typically 20 ms long) with a target bit rate packet for transmission and represents critical background noise segments (again typically 20 ms long) with a relatively small size packet. This small packet may be a silence descriptor (SID) indicating silence. A critical background noise segment might be the background noise segment that immediately follows a talk spurt, or a background noise segment whose characteristics are significantly different from its precedent noise segments. Other types of background noise segments (or non-critical background noise segments) may be denoted with zero bits, or blanked, or not transmitted, or suppressed from transmission. When such a pattern of output packets (namely active segment(s), then critical background noise segment(s), then non-critical background noise segment(s)) purely depends on the input of the speech encoder, or the source, such a DTX scheme is called a source-controlled DTX scheme.

FIGS. 5A and 5B show examples of relations between channel state information, the criticality threshold value that is based on that information, and the resulting likelihood that a decision to retransmit will be made. In the example of FIG. 5B, the reported quality of the channel is lower than the reported quality of the channel in FIG. 5A. Consequently, the criticality threshold value in FIG. 5B is less selective than the criticality threshold value in FIG. 5A, and the resulting likelihood that a decision to retransmit will be made is higher. If the reported quality of the channel becomes too low, the resulting likelihood that a decision to retransmit will be made may become too high.

It may be desirable to implement method M100 to limit the number or proportion of frames that may be retransmitted. For example, it may be desirable to balance improving performance under bad channel conditions against preserving native speech coding quality and/or arresting capacity loss due to retransmissions that may be triggered due to an overly inclusive criticality determination.

One approach to limiting retransmission frequency is to implement task T200 such that the threshold value is subject to a low cap value (i.e., a low boundary value, or a floor value) that sets a limit on how many frames may be retransmitted. For example, task T200 may be implemented to enforce a minimum value on the calculated threshold value. FIG. 6B shows a flowchart of such an implementation T210 of task T200 that includes subtasks T210a, T210b, and T210c. Task T210a calculates a candidate threshold value as described herein (i.e., based on channel state information). Task T210b compares the calculated candidate threshold value to a boundary value (e.g., a low cap value). Based on a result of the comparison, task T210c selects one among (A) the calculated candidate threshold value and (B) the boundary value, such that task T210 produces the selected value as the calculated threshold value. For example, task T210c may be implemented to select the calculated candidate value if it is greater than (alternatively, not less than) the boundary value, and to select the boundary value otherwise. In such manner, task T210 may be configured to clip the calculated threshold value to the cap value. Task T210 may also be configured such that when the comparison fails (e.g., when clipping occurs), task T210 indicates such a condition to another module (e.g., for logging the condition, reporting the condition to the base station, and/or performing another remedial action).

Of course, it is also possible to implement task T100 alternatively such that the calculated value of the criticality measure is inversely proportional to criticality. In such case, task T350 may be configured to decide to retransmit the frame when the criticality measure is below (alternatively, fails to exceed) the calculated threshold value, and task T210 may be configured to compare (and possibly to clip) the calculated threshold value to a high cap value (i.e., a high boundary value, or a ceiling value).

Figure 7B:
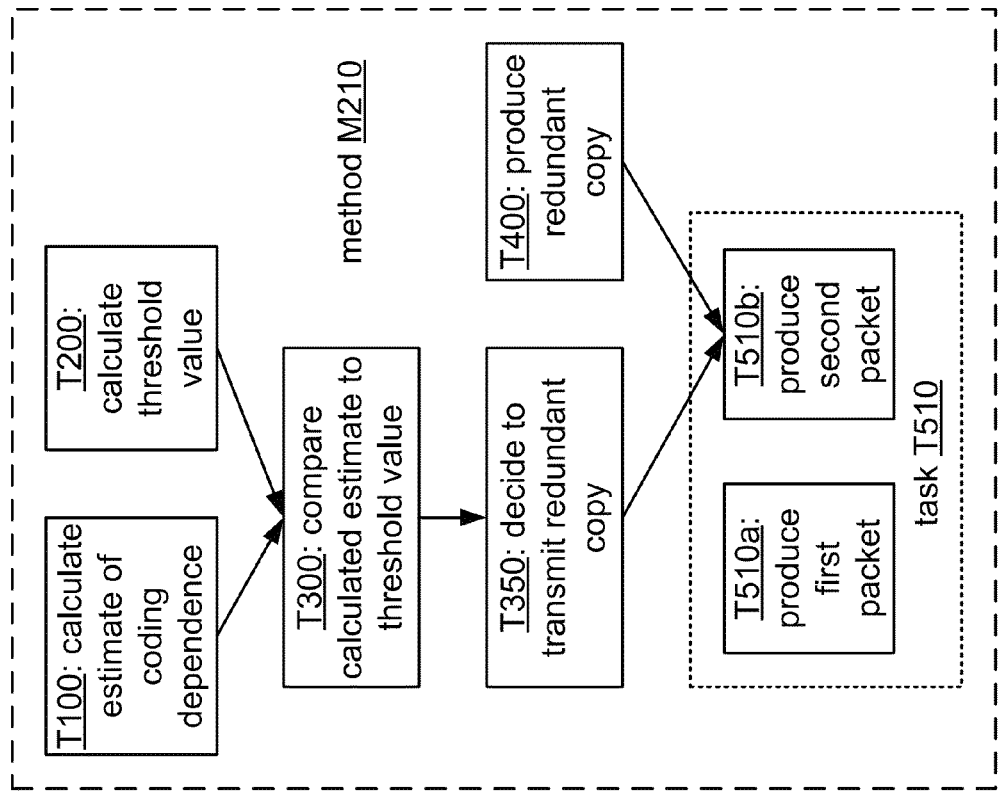
FIG. 7B shows a flowchart of an implementation M210 of method M200.
Figure 7A:
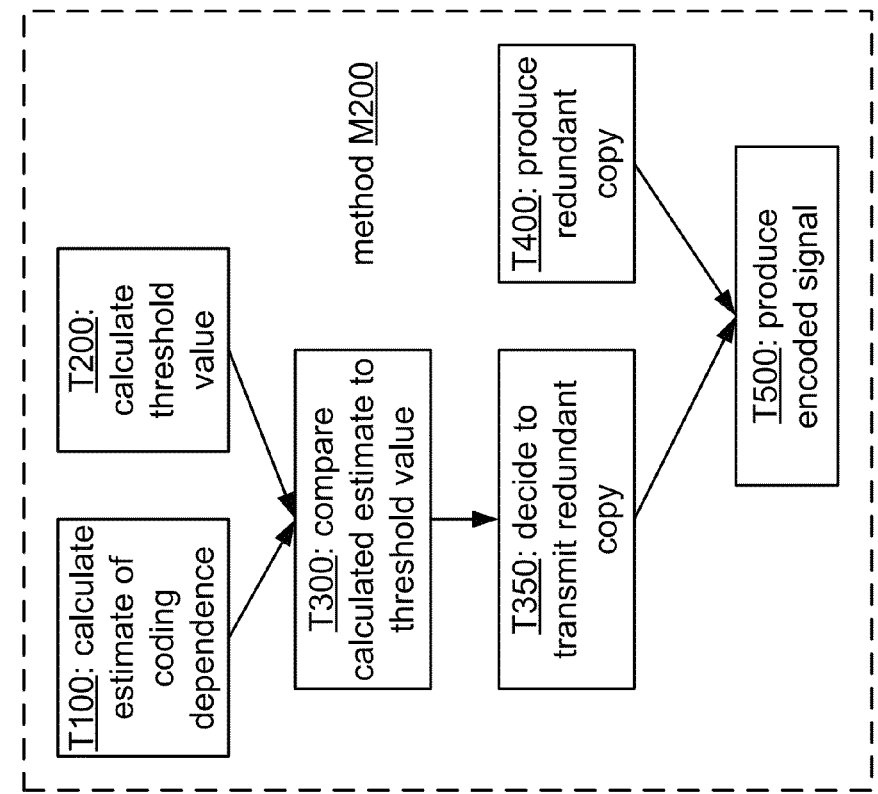
FIG. 7A shows a flowchart of an implementation M200 of method M100.

FIG. 7A shows a flowchart for an implementation M200 of method M100 that includes task T400. Task T400 produces a redundant copy of the model frame. The redundant copy typically has fewer bits than the primary copy of the model frame in the encoded signal (i.e., the copy of the model frame as encoded normally) and may be used by a decoder to perform a forward error correction (FEC) operation to correct errors resulting from partial or complete loss of the primary copy. Task T400 may be implemented to produce the redundant copy prior to decision task T350 or, alternatively, in response to a decision by task T350 to transmit a redundant copy.

Typically it is desirable for the redundant copy to provide a good reference (e.g., a good adaptive codebook) that may be used for decoding subsequent frames. The redundant copy of the model frame may include some or all of the parameters of the primary copy of the model frame. Task T400 may be implemented to produce the redundant copy as a reduced version of a primary copy of the model frame. For example, the primary copy may be an encoded version of the model frame that includes components such as frequency envelope information (e.g., LPC or MDCT coefficients) and/or temporal envelope information (e.g., fixed codebook index, fixed codebook gain, adaptive codebook gain, pitch lag, and/or pitch gain for a CELP codec; prototype parameters and/or pitch information for a PWI or PPP codec). Task T400 may be implemented to produce the redundant copy to include a copy of part or all of each of one or more such components. For example, task T400 may be implemented to produce the redundant copy to include one or more codebook indices that identify quantized LPC filter parameters and/or quantized temporal envelope (e.g., excitation signal) parameters.

In such cases, task T400 may be implemented to assemble the redundant copy using (e.g., duplicating and/or condensing) components of a primary copy of the model frame that have already been calculated. Task T400 may be implemented to produce a redundant copy in such manner to satisfy a bit constraint or in compliance with a structure associated with a rate constraint. Such a structure may include a specified number of bits, for the frame or for each of one or more subframes of the frame, for each of a plurality of parameters, such as those mentioned above (i.e., LPC filter information, pitch delay, fixed/adaptive codebook index/gain, etc.).

Additionally or alternatively, task T400 may be implemented to produce part or all of the redundant copy by encoding the model frame using a coding method that is different from the one used to produce the primary copy of the model frame. In such a case, this different coding method will typically have a lower rate than the method used to produce the primary copy of the model frame (e.g., using a lower-order LPC analysis, using a narrowband codec rather than a wideband codec, etc.). Such a different coding method may be a different bit rate and/or a different coding scheme (e.g., CELP for the primary copy and PPP or PWI for the redundant copy). In one example, task T400 is implemented to provide the model frame and the indicated allocation $N_m$ (e.g., as a number of bits, or as a bit rate) to a frame encoder (e.g., frame encoder FE20).

The size of the redundant copy may be indicated as a number of bits or as a bit rate and may be fixed or adjustable. In one example, the size of the redundant copy is indicated as part of a redistribution of an initial bit allocation T for a frame that is subsequent to the model frame in the audio signal and on which the redundant copy is to be piggybacked (the "carrier" frame). The carrier frame may be the same as the dependent frame, or method M200 may be implemented such that the dependent and carrier frames may be different. Particular examples for the value of T include 253 bits (which corresponds to, e.g., a bit rate of 12.65 kbps (kilobits per second) and a frame length of twenty milliseconds) and 192 bits (which corresponds to, e.g., a bit rate of 9.6 kbps and a frame length of twenty milliseconds).

In one such case, a selected reallocation distribution $N_m$ indicates a split of an initial bit allocation T for the carrier frame into an allocation of $N_m$ bits to the redundant copy of the model frame and an allocation of $(T-N_m)$ bits to the copy of the carrier frame. Selection of one among a set of distributions of an allocation of T bits may be implemented as a change in the bit rate of the selected carrier frame and selection of a low-bit-rate scheme to encode the redundant copy of the model frame. For example, distributing the allocation of T bits as a portion of size $N_m$ bits to carry a redundant copy of the model frame and a portion of size $(T-N_m)$ bits to carry a primary copy of the carrier frame, where T=253 and $N_m$=61, may be implemented (e.g., within an AMR codec) by changing the bit rate of the carrier frame from a starting bit rate of 12.65 kbps to a reduced bit rate of 9.6 kbps, encoding the carrier frame according to an existing 9.6-kbps scheme, and using a 3.05-kbps scheme to encode a redundant copy of the model frame.

It may be desirable to implement several such low-bit-rate schemes for redundant encoding, each one corresponding to a different one among the set of distributions. Examples of other starting bit rates include 8.85, 8.55, 6.6, 6.2, 4, 2.7, and 2 kbps, which correspond (e.g., for a frame length of twenty milliseconds) to values of T of 177, 171, 132, 124, 80, 54, and 40, respectively. Further examples of other starting bit rates include 23.85, 23.05, 19.85, 18.25, 15.85, 14.25, and 12.65 kbps, which correspond (e.g., for a frame length of twenty milliseconds) to values of T of 477, 461, 397, 365, 317, 285, and 253, respectively. A frame may be encoded according to such a rate as described, for example, in Release 10 of the AMR-WB codec referenced herein (e.g., using a CELP coding model).

Task T400 may be implemented to select the size of the redundant copy (e.g., to select a particular reallocation of T) according to a value of a measure of compressibility of the carrier frame. For example, such a task may be configured to select a larger size for the redundant copy (e.g., to select a corresponding reallocation) in response to a value that indicates high compressibility and to select a smaller size for the redundant copy (e.g., to select a corresponding reallocation) in response to a value that indicates low compressibility. One example of a static measure of compressibility is an open-loop metric that may be calculated as a correlation of subframes of the carrier frame to one another (e.g., the maximum correlation over all possible lag values and all pairs (or all adjacent pairs) of subframes, or an average of the maximum correlation over all possible lag values for each pair (or for each adjacent pair) of subframes). One example of a dynamic measure of compressibility is a closed-loop metric that indicates, for each of a plurality of redundant copy size candidates and/or carrier frame candidates, a measure of an associated change (e.g., reduction) in perceptual quality of the carrier frame. For example, such a metric may be calculated as a difference (e.g., an absolute difference) or a ratio of (A) a measure of perceptual quality of the carrier frame as encoded using an entire initial bit allocation T and (B) a measure of perceptual quality of the carrier frame as encoded using only the portion of the initial bit allocation that remains after the redundant copy size candidate is applied.

Task T400 may include reallocating an initial bit allocation T for the subsequent frame into a first portion and a second portion, according to a selected reallocation candidate, encoding a copy of the carrier frame into the first portion, and encoding the redundant copy of the model frame into the second portion. Task T400 may be implemented to produce the copy of the carrier frame prior to selection of a reallocation candidate (e.g., as an input parameter to a reallocation decision metric calculation) or in response to selection of a reallocation candidate.

Although application of the principles described herein to fixed-bit-rate schemes is noted above (e.g., wherein each frame receives the same initial bit allocation T), it is also possible to apply such principles to schemes in which the total frame allocation of T bits may change from one frame to another. For example, the number of bits T available to encode the carrier frame may vary according to whether the carrier frame contains speech or noise, or according to whether the carrier frame contains voiced speech or unvoiced speech, etc.

Additionally or in the alternative to reallocating bits to encode the redundant copy, under bad channel conditions it may be desirable to increase the number of bits used to encode a redundant copy of a critical frame. In response to input regarding the channel condition (e.g., channel state information as described herein with reference to task T70), for example, method M200 may be implemented to adjust the extent and frequency of redundancy that may be transmitted over the impaired channel. The number of bits used in task T400 to encode a redundant copy may be subject to a high cap that reflects a balance between improved performance under bad channel conditions and preservation of native speech coding quality and/or reducing capacity loss due to re-transmissions. In such cases, the number of bits used to encode the redundant copy may be additional to the primary frames rather than reallocated from a subsequent frame (i.e., from a carrier frame). For example, the number of bits for the redundant copy may be independent of the number of bits used for the primary frames and may be determined with reference to information received (e.g., via the transmission channel), such as channel capacity and/or network state (e.g., congestion).

Method M200 also includes a task T500, which produces an encoded signal that includes the redundant copy of the model frame. For example, task T500 may be implemented to piggyback the redundant copy onto one or more carrier frames as described above (e.g., frames in the encoded signal which correspond to frames that are subsequent in the original signal to the model frame). In one such example, the redundant copy is included in a packet assigned to a carrier frame that is subsequent to the model frame in the input audio signal. In such case, task T500 may include determining the value of a carrier offset p, which identifies the subsequent frame that is to carry the redundant copy by indicating the number of frames between the model frame and the carrier frame in the original signal. Alternatively or additionally, task T400 may include selecting a number of bits to reallocate from encoding the subsequent frame to encoding the redundant copy, which selection may be based on a measure of perceptual quality of the resulting subsequent frame as decoded. It may also be desirable to implement task T500 to include, within the encoded signal, information indicating the value of the offset and/or the number of reallocated bits. Alternatively, such information may be derivable by the decoder from other information in the encoded signal.

The value of carrier offset p indicates a distance between the model frame n and the carrier frame (n+p). The value of offset p may be the same as the value of offset k (i.e., such that the dependent frame is the carrier frame), or method M200 may be implemented to allow the dependent offset k to have a different value than the carrier offset p. Method M200 may be implemented such that the offset p between the model frame and the carrier frame (e.g., an indication of the difference in frame number, or one more than the number of intervening frames) is fixed. In a typical example, the value of p is three. In another example, the value of p is four. Other possible values include one, two, three, five, and integers greater than five.

Figure 8:
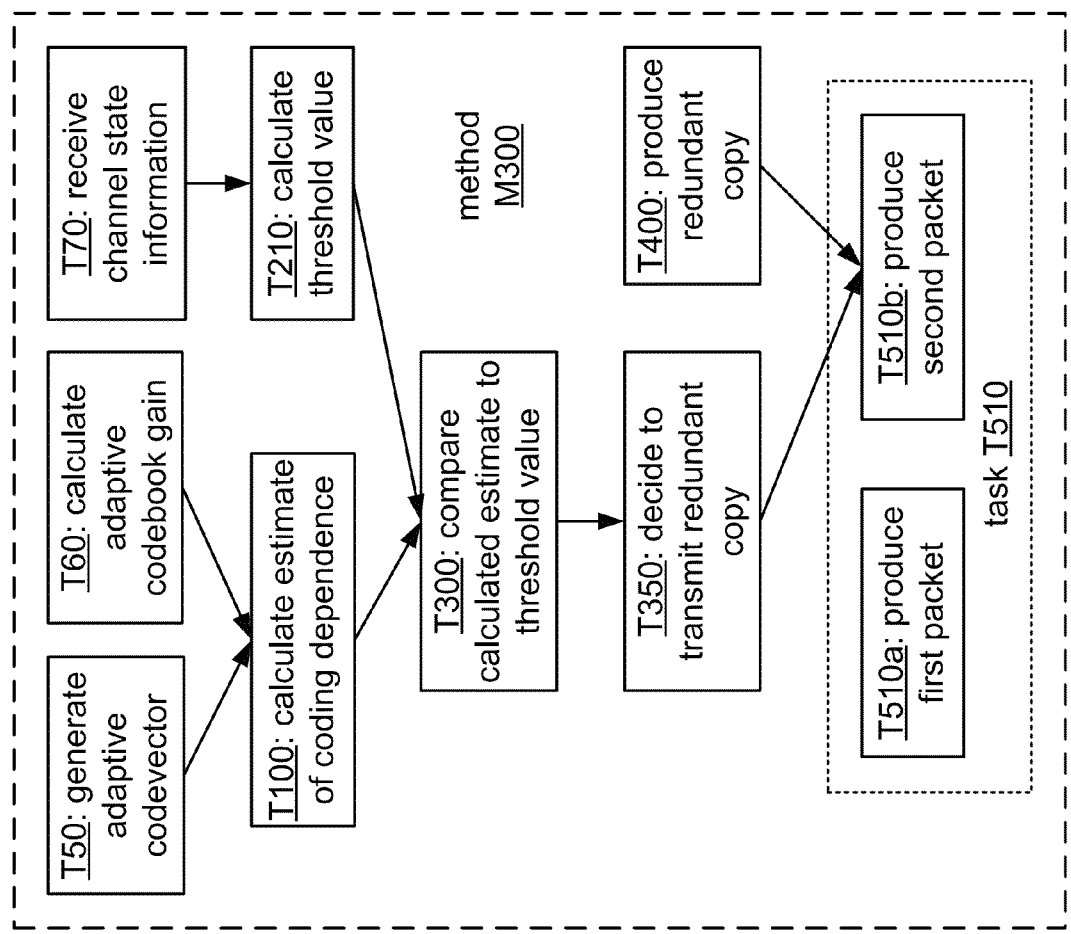
FIG. 8 shows a flowchart of an implementation M300 of methods M110, M120, and M210.

FIG. 7B shows a flowchart for an implementation M210 of method M200 that includes an implementation T510 of task T500. Task T510 includes a subtask T510a which produces a first packet that contains a primary copy of model frame n. Task T510 also includes a subtask T510b which produces a second packet that contains a copy of carrier frame (n+p) and the redundant copy of model frame n as produced by task T400. It may be desirable to implement task T510b to produce the second packet to include information indicating that it carries a redundant copy of the model frame, indicating the value of the offset p, and/or indicating the number of reallocated bits $N_m$. Alternatively, such information may be derivable by the decoder from other information in the encoded signal. Task T510 may be implemented to perform task T510b in response to retransmit decision T350. FIG. 8 shows a flowchart of an implementation M300 of methods M110, M120, and M210.

Task T500 may be implemented to select the carrier frame (e.g., to select a value for carrier offset p) based on an estimated likelihood that the carrier frame (e.g., frame (n+p)) will also be a critical frame, as it may be desirable to avoid reallocating bits away from a primary copy of another critical frame. Typically such a likelihood is highest for the frame that immediately follows the critical frame (i.e., frame (n+1)) and decreases rapidly as p increases. For voiced speech, the onset frame and the frame that immediately follows it (e.g., to cover the case when the onset frame is lost) are typically critical. However, it is also possible for another subsequent frame to be critical (e.g., for a case in which the pitch lag drifts).

Additionally or alternatively, task T500 may be implemented to select the carrier frame (e.g., to select a value for carrier offset p) according to the length of a frame (e.g. in milliseconds) in the original time-domain signal and a maximum allowable delay. For example, the value of p may be constrained by a maximum allowable value (e.g., to limit frame delay). It may be desirable for the maximum allowable delay to have a value of eighty or one hundred milliseconds. In such case, p may have a maximum value of four or five for a scheme using twenty-millisecond frames, or a maximum value of eight, nine, or ten for a scheme using ten-millisecond frames.

Additionally or alternatively, task T500 may be implemented to select the carrier frame (e.g., to select a value for carrier offset p) according to channel conditions (e.g., as indicated by feedback from a receiver and/or other channel state information as described herein). For example, the value of carrier offset p indicates the length of an interval between the transmit time of the primary copy of a frame and the transmit time of the redundant copy of the frame, and it may be desirable to use a higher value of p in an environment that is causing a frequent loss of consecutive frames (e.g., due to long fades). Usually the packet losses in a packet-switched network are bursty, and the burst lengths may be different under different network conditions. Thus, using a dynamically adjusted carrier offset value may result in better error-protection performance. An optimal carrier offset value may be estimated using the channel state information (e.g., as sent by the receiver and/or another entity). For example, the carrier offset value can be adaptively adjusted (e.g., at run-time) based on the channel condition. Alternatively, the carrier offset value may be predetermined.

Additionally or alternatively, task T500 may be implemented to select the carrier frame (e.g., to select a value for carrier offset p) based on a value of an associated measure of compressibility. For example, task T500 may be implemented to select a carrier frame from among a plurality P of frames that are subsequent to the model frame in the input audio signal (e.g., to select a corresponding value of p, where $1<p<P$). In such case, task T500 may be implemented to select the carrier frame as the most compressible among the P candidate frames, as indicated by corresponding values of the compressibility measure for each of the P frames. Examples of compressibility measures that may be used for such frame selection include static measures (e.g., open-loop metrics) and dynamic measures (e.g., closed-loop metrics) as discussed above.

Method M200 may be implemented to include encoding at least one of the plurality P of carrier frame candidates (e.g., a non-carrier frame) using T bits. Such a method may even include encoding each of the non-carrier ones of the plurality of P candidate frames using T bits. However, it is also possible for the signal to include two adjacent critical frames, or two critical frames that are otherwise close to one another, such that the set of P carrier frame candidates relative to one critical frame overlaps (i.e., has at least one frame in common with) the set of P carrier frame candidates relative to the other critical frame. In such a case, one of the common subsequent frames may be selected to carry a redundant copy of one critical frame, and another of the common subsequent frames may be selected to carry a redundant copy of the other critical frame, such that each of these two subsequent frames is encoded using less than T bits. It is also possible that a selected subsequent frame may itself be a critical frame. In some cases, for example, it may be expected that the set of P carrier frame candidates relative to a critical frame may include at least one other critical frame about twenty percent of the time.

Figure 9A:
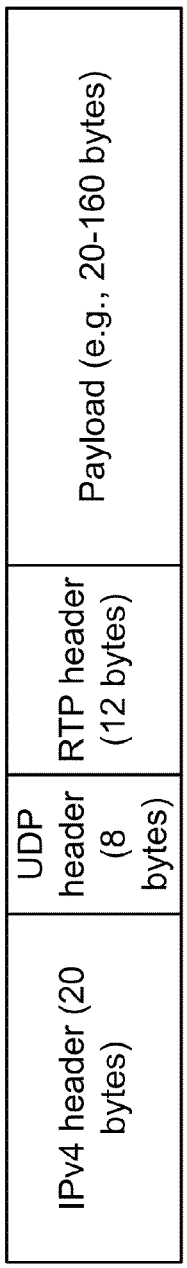
FIG. 9A is a diagram of an IPv4 packet.
Figure 9B:
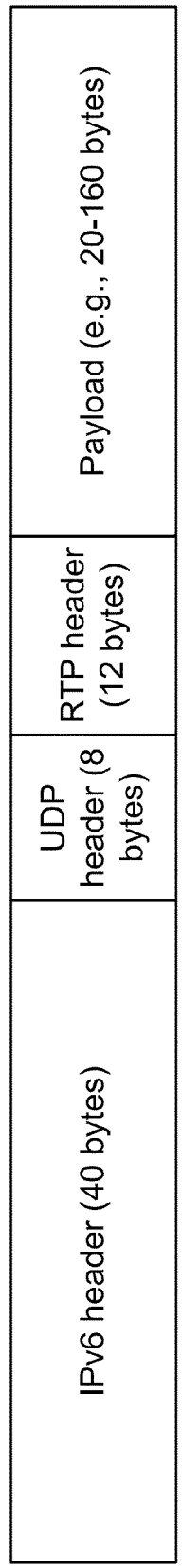
FIG. 9B is a diagram of an IPv6 packet.

A packet may include one or more frames. It may be desirable to limit packet length to 20 milliseconds (e.g., to reduce lag). FIG. 9A shows an example of the overhead for a packet encoded using a typical protocol stack for VoIP communications that includes Internet Protocol version 4 (IPv4), User Datagram Protocol (UDP), and RTP. FIG. 9B shows a similar example for an IP version 6 (IPv6) packet. Examples of payload size include 160 bytes for a G.711 codec, 20 bytes for a G.729 codec, and 24 bytes for a G.723.1 codec. Other codecs that may be used with a method of adaptive criticality indication as described herein include, without limitation, G.726, G.728, G.729A, AMR, AMR-WB, AMR-WB+, VMR-WB, EVRC, SMV, and EVS as cited above.

FIG. 10 shows an example of a payload for an RTP packet that carries a redundant copy of a model frame and a copy of a frame that is subsequent to the model frame. The redundant copy (bits r(0) to r(176)) is encoded at the AMR-WB 8.85 kbps mode, as indicated by the value of one for the corresponding frame type indicator FT, and the copy of the carrier frame (bits p(0) to p(131)) is encoded at the AMR-WB 6.6 kbps mode, as indicated by the value of zero for the corresponding frame type indicator FT. In this example, the codec mode request indicator CMR requests the encoder at the receiving terminal to adopt the 8.85 kbps mode, and the payload ends with three padding bits P to fill out the last octet. In another example, the payload may contain more than two encoded frames, and/or the redundant copy may have fewer bits (i.e., may be encoded at a lower rate) than the copy of the carrier frame, and/or the bits of the redundant copy may precede the bits of the copy of the carrier frame in the packet (with the order of the corresponding table-of-contents entries for the copies being switched accordingly).

It may be desirable to implement task T510 to use header compression: for example, to compress the RTP header from twelve bytes down to four bytes. The RTP header includes a timestamp, which may be used to calculate transmission time, and a sequence number, which may be used to correctly present packets that are received out of order and/or to detect packet loss. Robust Header Compression (ROHC; as described in IETF RFC 3095, RFC 3843, and/or RFC 4815) may be used to support greater compression rates (e.g., compression of one or more, and possibly all, packet headers down to one to four bytes).

In one configuration, task T510b is implemented to packetize the copy of the carrier frame (i.e., the current speech frame (n+p)) and the redundant copy of the model speech frame n into real-time protocol (RTP) packets for transmission to a receiving terminal. In another configuration of task T510b, a copy of the subsequent frame (n+p) and the redundant copy of the model speech frame n, although generated at the same time, are packed into different corresponding RTP packets and transmitted to the receiving terminal. The decision of which format to use may be based on the capabilities of both terminals. If both formats are supported in each terminal, the format causing lower data rate may be used.

Figure 11:
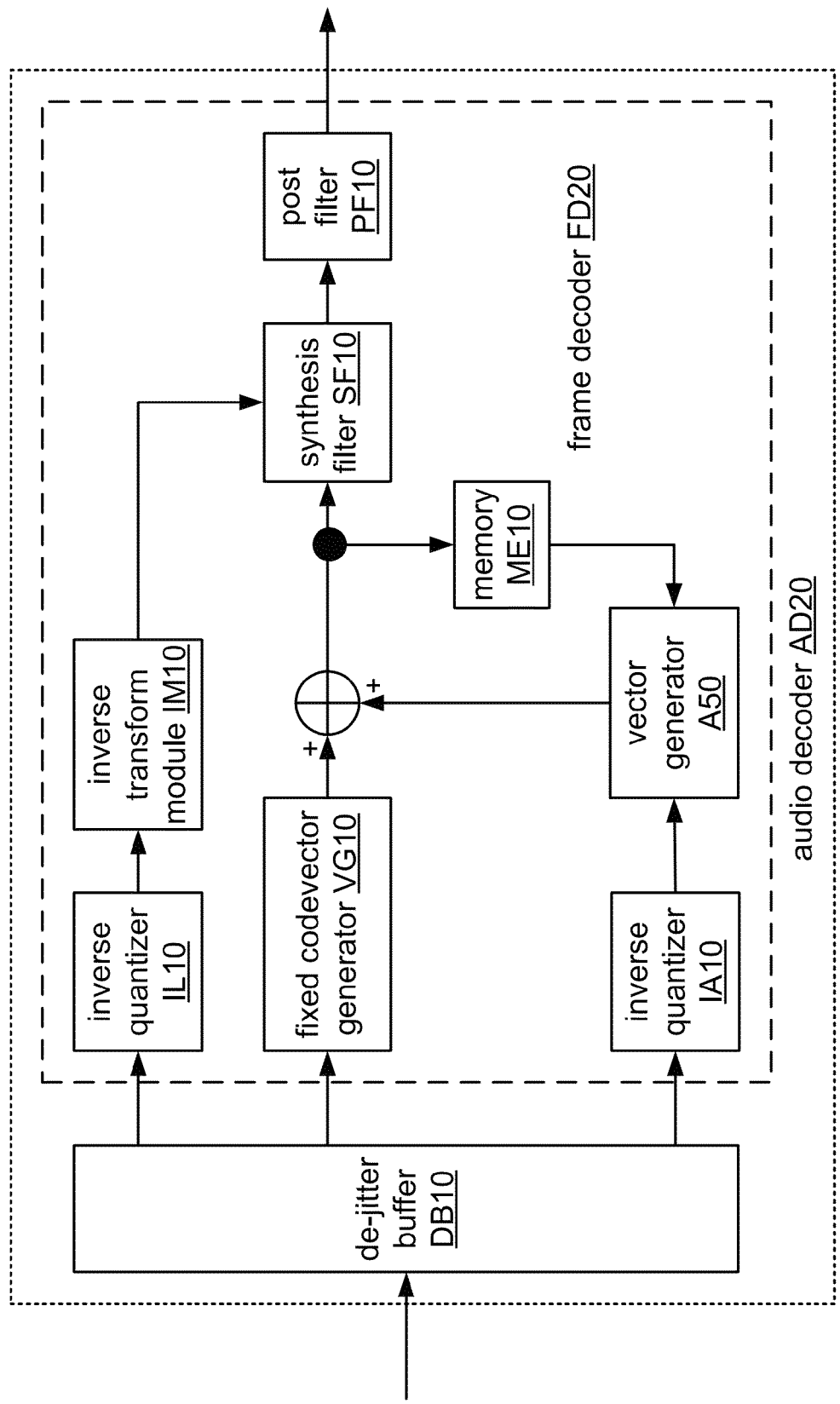
FIG. 11 is a block diagram of an implementation AD20 of audio decoder AD10.

FIG. 11 is a block diagram of an implementation AD20 of audio decoder AD10. Audio decoder AD20 may be implemented as part of a vocoder, as a stand-alone entity, or distributed across one or more entities within receiving terminal 104. Audio decoder AD20 may also be implemented as part of a VoIP client.

Audio decoder AD20 will be described below in terms of its functionality. Audio decoder AD20 may be implemented as hardware, firmware, software, or any combination thereof, and the manner in which it is implemented may depend on the particular application and the design constraints imposed on the overall system. By way of example, audio decoder AD20 may be implemented with a microprocessor, digital signal processor (DSP), programmable logic, dedicated hardware, or any other hardware- and/or software-based processing entity.

In this example, audio decoder AD20 includes a de-jitter buffer DB10 (also called a "jitter buffer"). De-jitter buffer DB10 may be a hardware device or software process that reduces or eliminates jitter caused by variations in packet arrival time (due, for example, to network congestion, timing drift, and/or route changes). De-jitter buffer DB10 may receive audio frames in packets. De-jitter buffer DB10 may be implemented to delay newly-arriving packets so that frames in the previously-arrived packets can be continuously provided to frame decoder FD20, in the correct order (e.g., as indicated by the timestamps of the packets), resulting in a clear connection with little audio distortion. De-jitter buffer DB10 may be fixed or adaptive. A fixed de-jitter buffer may introduce a fixed delay to the packets. An adaptive de-jitter buffer, on the other hand, may adapt to changes in the networks delay. De-jitter buffer DB10 may provide encoded audio frames (e.g., including indices XL, XF, XG, and XP) to frame decoder FD20 in appropriate order.

If a copy of a frame is not received by the de-jitter buffer, a frame loss may be caused if the FEC is not used. When FEC is used and the copy of the current to-be-played frame is lost, de-jitter buffer DB10 may determine whether there is a redundant copy of the frame in the buffer. If a redundant copy for the current frame is available, the redundant copy may be provided to frame decoder FD20 for decoding to generate audio samples.

In addition, the de-jitter buffer DB10 may be modified to process a primary frame (i.e., the original critical frame) and a redundant frame (i.e., a copy of some or all of the original critical frame) differently. Buffer DB10 may process these two frames differently so that the average delay associated with implementing an FEC operation as described herein is no larger than the average delay when the FEC operation is not implemented. For example, buffer DB10 may be implemented to detect that an incoming packet contains a redundant copy (e.g., that the packet contains two frames) and to initiate decoding of the redundant copy in response to this detection.

The audio frames released from de-jitter buffer DB10 may be provided to frame decoder FD20 to generate decoded core audio frames DF (e.g., synthesized speech). In general, frame decoder FD20 may be implemented to perform any method of decoding speech into synthesized speech known in the art. In the example of FIG. 11, frame decoder FD20 uses a CELP decoding method that corresponds to the encoding method described above with reference to FIG. 3. In this example, fixed codevector generator VG10 decodes FCB index XF and a corresponding portion of gain index XG to produce fixed codevectors for each sub-frame, inverse quantizer IA10 and vector generator A50 decode ACB index XP and a corresponding portion of gain index XG to produce adaptive codevectors for each sub-frame, and adder AD10 combines the corresponding codevectors to produce the excitation signal and to update memory ME10 (e.g., as described in steps 1-8 of section 6.1 of 3GPP TS 26.190 v11.0.0). Inverse quantizer IL10 and inverse transform module IM10 decode LPC index XL to produce LP filter coefficient vectors, which are applied to the excitation by synthesis filter SF10 to produce a synthesized signal (e.g., as described in the initial paragraph and step 4 of section 6.1 of 3GPP TS 26.190 v11.0.0). The raw synthesized signal is provided to post-filter PF10, which may be implemented to perform operations such as high-pass filtering, upscaling, and interpolation (e.g., as described in section 6.2 of 3GPP TS 26.190 v11.0.0) to produce the decoded core audio frames DF. Alternatively, and without limitation, frame decoder FD20 may use NELP or PPP full-frame decoding methods.

Redundant copies of frames that include some (i.e., a partial set) of the parameter values of the primary copy may be passed from de-jitter buffer DB10 to a partial frame decoding module. For example, frame decoder FD20 may be implemented to generate a frame corresponding to the critical frame (e.g., according to an error concealment procedure as described in 3GPP TS 26.091, v.11.0.0 as referenced above) before the redundant copy is available. In this case, frame decoder FD20 may include a partial frame decoding module that is configured to update memory ME10 (e.g., according to fixed and adaptive codebook indices and gains from the redundant copy) before decoding the carrier frame (n+p).

At the receiver side, the speech frames may be stored in de-jitter buffer DB10, which may be adaptive. As previously mentioned, de-jitter buffer DB10 may be designed so that the average delay for speech frames is no larger than the average delay without FEC techniques. The frames may be sent to a frame decoder (e.g., decoder FD20) in the proper order from de-jitter buffer DB10. If the redundant copy is a partial set of the parameters of the primary copy, a partial frame decoding module may be used.

A source- and channel-controlled FEC scheme as described herein may reduce the number of packet losses and the burstiness of the losses with little or no increase in the data rate. Critical frame identification may help to ensure a good trade-off between speech perceptual quality and the data rate. Such an FEC scheme may be implemented to use the available bandwidth efficiently and to be backward compatible with legacy communication devices.

Audio encoder AE10 may be implemented to include a dynamic rate control module. Such a module may implement two steps to approach a predetermined target rate. In the first step, two adjacent operating points are determined. These two adjacent operating points, which may be data rates, are chosen so that the value of the target data rate is between the values of the two operating points. The target data rate may be specified externally based on the capacity demands. Alternatively, the target data rate may be specified internally based on, for example, the channel state information. Such rate control may be implemented to allow an FEC scheme as described herein to be carried out at any specified data rate, so that operators may decide the data rate based on capacity demand.

Figure 12B:
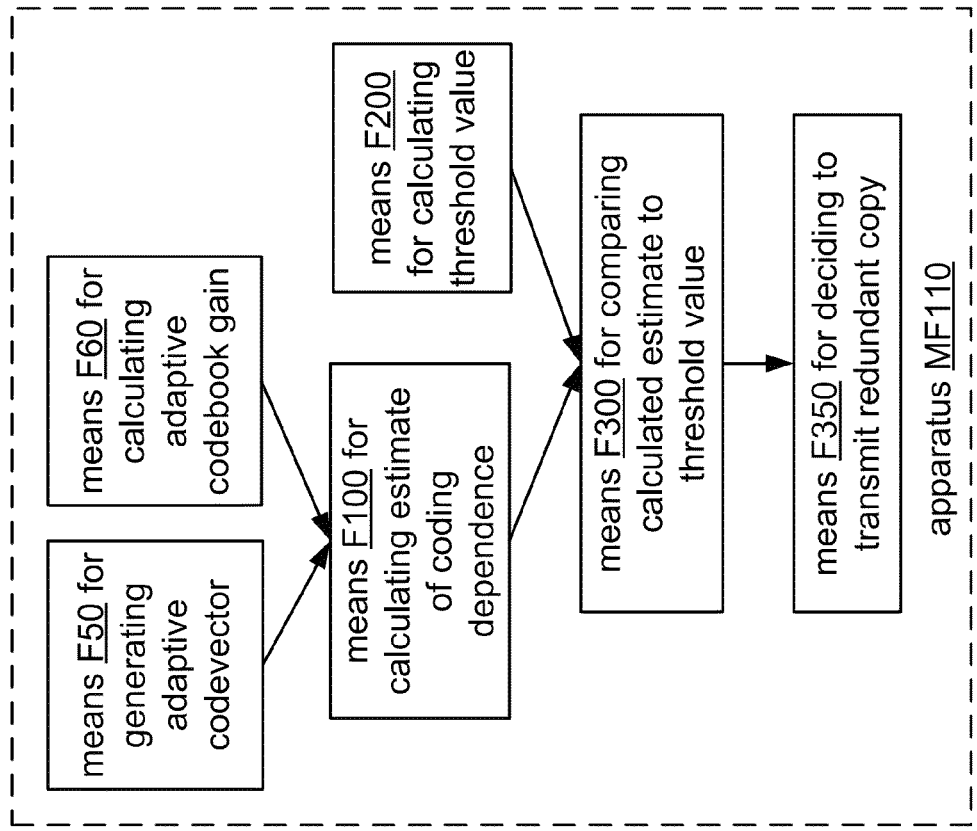
FIG. 12B shows a block diagram of an implementation MF110 of apparatus MF100.
Figure 12A:
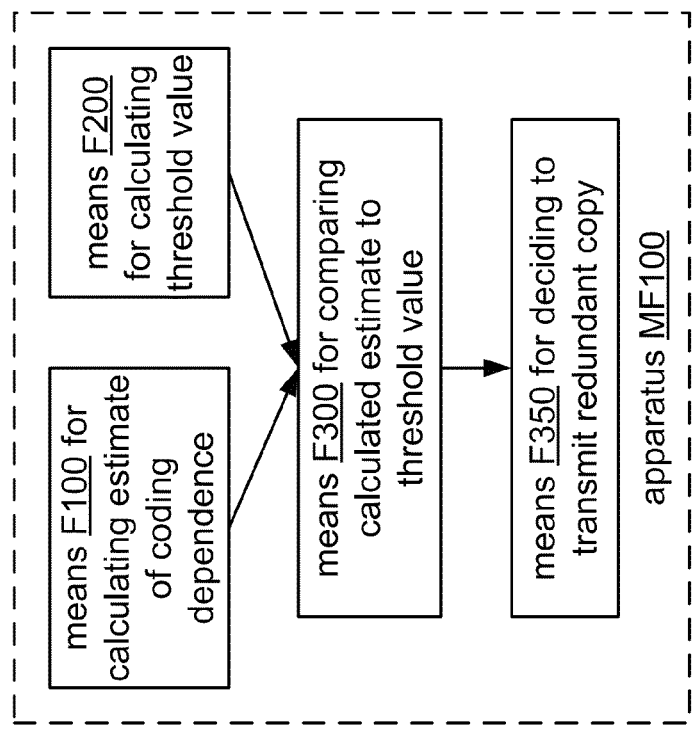
FIG. 12A shows a block diagram of an apparatus MF100 according to a general configuration.

FIG. 12A shows a block diagram of an apparatus for signal processing MF100 according to a general configuration. Apparatus MF100 includes means F100 for calculating an estimate of coding dependence of a second frame of an audio signal on a first frame that precedes the second frame in the audio signal (e.g., as described herein with reference to task T100). Apparatus MF100 also includes means F200 for calculating a threshold value, based on information relating to a state of a transmission channel (e.g., as described herein with reference to task T200). Apparatus MF100 also includes means F300 for comparing the calculated estimate to the calculated threshold value (e.g., as described herein with reference to task T300). Apparatus MF100 also includes means F350 for deciding to transmit a redundant copy of the first frame, based on a result of the comparing (e.g., as described herein with reference to task T350).

FIG. 12B shows a block diagram of an implementation MF110 of apparatus MF100 that also includes means F50 for using information from the first frame to generate an adaptive codevector for the second frame (e.g., as described herein with reference to task T50) and means F60 for calculating an ACB gain value for an encoded version of the second frame (e.g., as described herein with reference to task T60). In this case, means F100 is configured to calculate the calculated estimate based on the adaptive codevector and ACB gain value.

FIG. 13A shows a block diagram of an implementation MF120 of apparatus MF100 that also includes means F70 for receiving channel state information (e.g., as described herein with reference to task T70). FIG. 13B shows a block diagram of an implementation MF200 of apparatus MF100 that also includes means F400 for producing a redundant copy of the first frame (e.g., as described herein with reference to task T400) and means F500 for producing an encoded signal that includes the redundant copy (e.g., as described herein with reference to task T500).

Figure 14B:
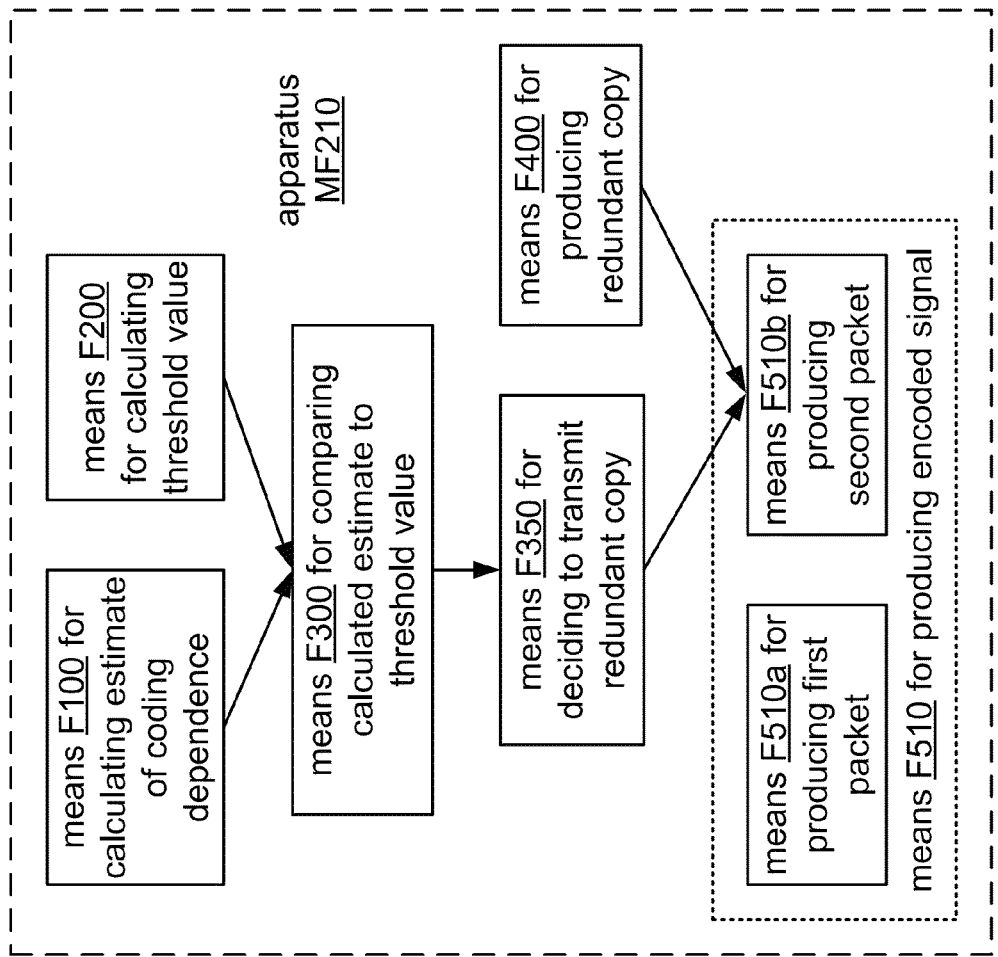
FIG. 14B shows a block diagram of an implementation MF210 of apparatus MF100.
Figure 14A:
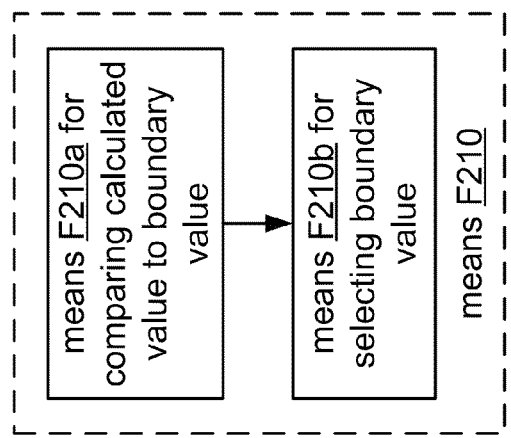
FIG. 14A shows a block diagram of an implementation F210 of means F200.

FIG. 14A shows a block diagram of an example F210 of an implementation of means F200 that may optionally be used in any implementation of apparatus MF100 as described herein. Means F210 includes means F210a for comparing a calculated value that is based on the information relating to the state of the transmission channel to a boundary value (e.g., as described herein with reference to task T210a) and means F210b for selecting the boundary value as the calculated threshold value, in response to a result of said comparing to the boundary value (e.g., as described herein with reference to tasks T210b and T210c).

Figure 15:
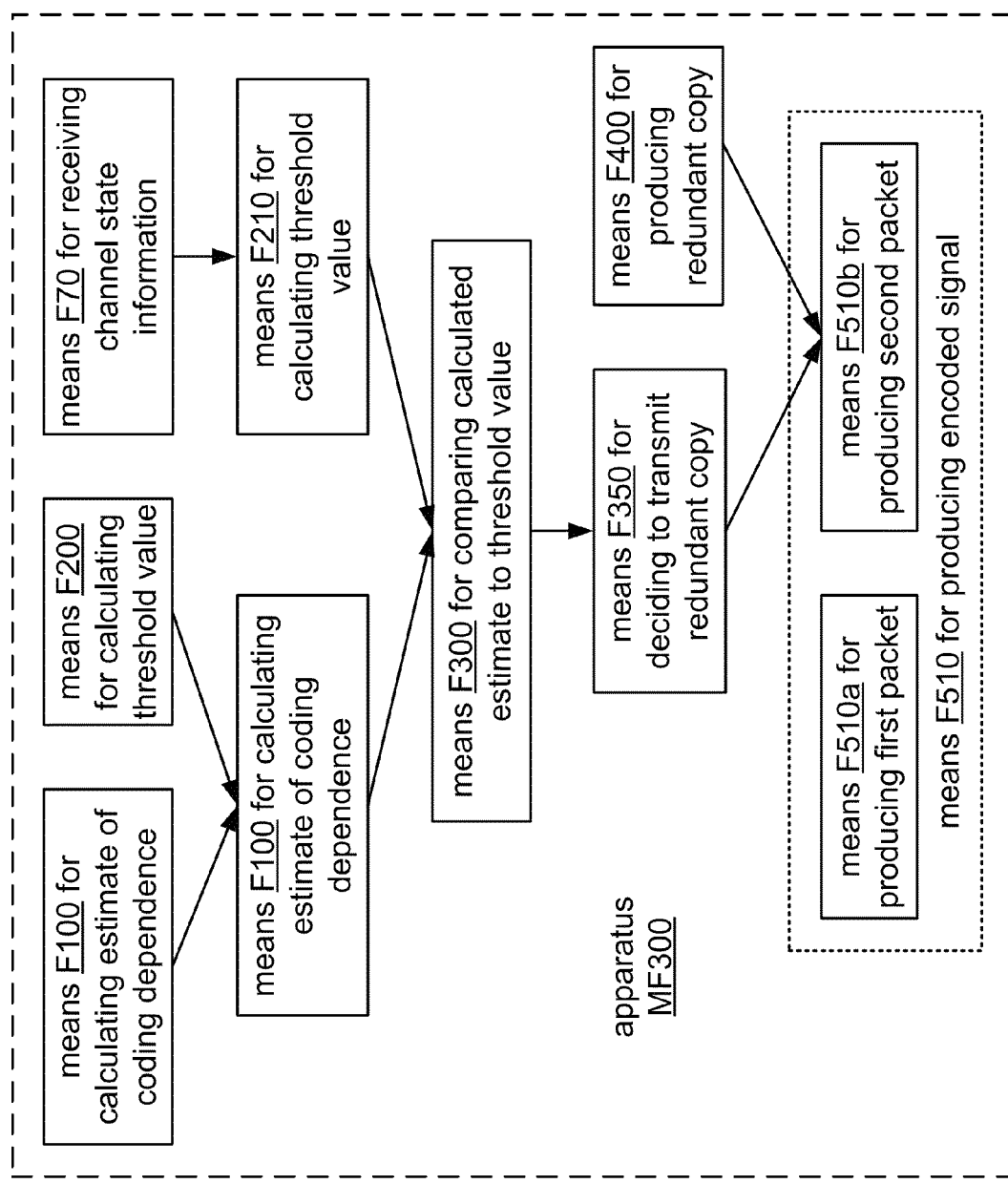
FIG. 15 shows a block diagram of an implementation MF300 of apparatus MF110, MF120, and MF210.

FIG. 14B shows a block diagram of an implementation MF210 of apparatus MF200 that includes an implementation F510 of means F500. Means F510 includes means F510a for producing a first packet that includes the primary copy of the first frame (e.g., as described herein with reference to task T510a) and means F510b for producing a second packet that includes the redundant copy of the first frame and a copy of the second frame, in response to said deciding (e.g., as described herein with reference to task T510b). FIG. 15 shows a block diagram of an implementation MF300 of apparatus MF110, MF120, and MF210.

FIG. 16A shows a block diagram of an apparatus AP100 according to a general configuration that includes a first calculator A100, a second calculator A200, and a mode selector A300. First calculator A100 is configured to calculate an estimate of coding dependence of a second frame of an audio signal on a first frame that precedes the second frame in the audio signal (e.g., as described herein with reference to task T100). Second calculator A200 is configured to calculate a threshold value, based on information relating to a state of a transmission channel (e.g., as described herein with reference to task T200). Mode selector A300 is configured (A) to compare the calculated estimate to the calculated threshold value and (B) to decide to transmit a redundant copy of the first frame, based on a result of the comparing (e.g., as described herein with reference to tasks T300 and T350).

FIG. 16B shows a block diagram of an implementation AP110 of apparatus AP100 that also includes a vector generator A50 configured to use information from the first frame to generate an adaptive codevector for the second frame (e.g., as described herein with reference to task T50) and an adaptive codebook gain calculator A60 configured to calculate an ACB gain value for an encoded version of the second frame (e.g., as described herein with reference to task T60). In this case, first calculator A100 is configured to calculate the calculated estimate based on the adaptive codevector and ACB gain value.

FIG. 16C shows a block diagram of an example A210 of an implementation of second calculator A200 that may optionally be used in any implementation of apparatus AP100 as described herein. Calculator A210 includes a comparator A210a configured to compare a calculated value that is based on the information relating to the state of the transmission channel to a boundary value (e.g., as described herein with reference to task T210a) and a selector A210b configured to select the boundary value as the calculated threshold value, in response to a result of said comparing to the boundary value (e.g., as described herein with reference to tasks T210b and T210c).

FIG. 16D shows a block diagram of an implementation AP120 of apparatus AP100 that also includes a channel decoder CD11 configured to receive channel state information (e.g., as described herein with reference to task T70). FIG. 16E shows a block diagram of an example A220 of an implementation of second calculator A200 that may optionally be used in any implementation of apparatus AP100 as described herein. Second calculator A220 includes a threshold value calculator A210c that is configured to calculate, based on channel state information, a first threshold value and a second threshold value, and a threshold value selector A210d that is configured to select the calculated threshold value from among the first and second threshold values, based on information from at least one among the first frame and a frame adjacent to the first frame in the audio signal (e.g., as described herein with reference to task T200). Second calculator A200 may be implemented as an implementation of both of calculators A210 and A220 (e.g., such that threshold value selector A210d provides the selected value to comparator A210a as the calculated value).

FIG. 17A shows a block diagram of an implementation AP200 of apparatus AP100 that also includes an implementation A400 of frame encoder FE10 (e.g., of frame encoder FE20) that is configured to produce a redundant copy of the first frame (e.g., as described herein with reference to task T400) and an implementation A500 of channel encoder CE10 that is configured to produce an encoded signal that includes the redundant copy (e.g., as described herein with reference to task T500). Frame encoder A400 may be configured to select the size of the redundant copy or to receive an indication of the size from another module of apparatus AP200 that is configured to perform such a selection (e.g., as described herein with reference to task T400).

FIG. 17B shows a block diagram of an implementation AP210 of apparatus AP200 that includes an implementation A510 of channel encoder A500. Channel encoder A510 includes a packet assembler A510a that is configured to produce a first packet that includes the primary copy of the first frame (e.g., as described herein with reference to task T510a) and to produce a second packet that includes the redundant copy of the first frame and a copy of the second frame, in response to said deciding (e.g., as described herein with reference to task T510b). FIG. 17C shows a block diagram of an implementation AP220 of apparatus AP210 that includes an offset calculator A520 configured to determine the value of an offset that indicates a total number of frames of the audio signal between the first and second frames (e.g., as described herein with reference to task T500, such as based on channel state information and/or compressibility of the second frame).

Figure 19:
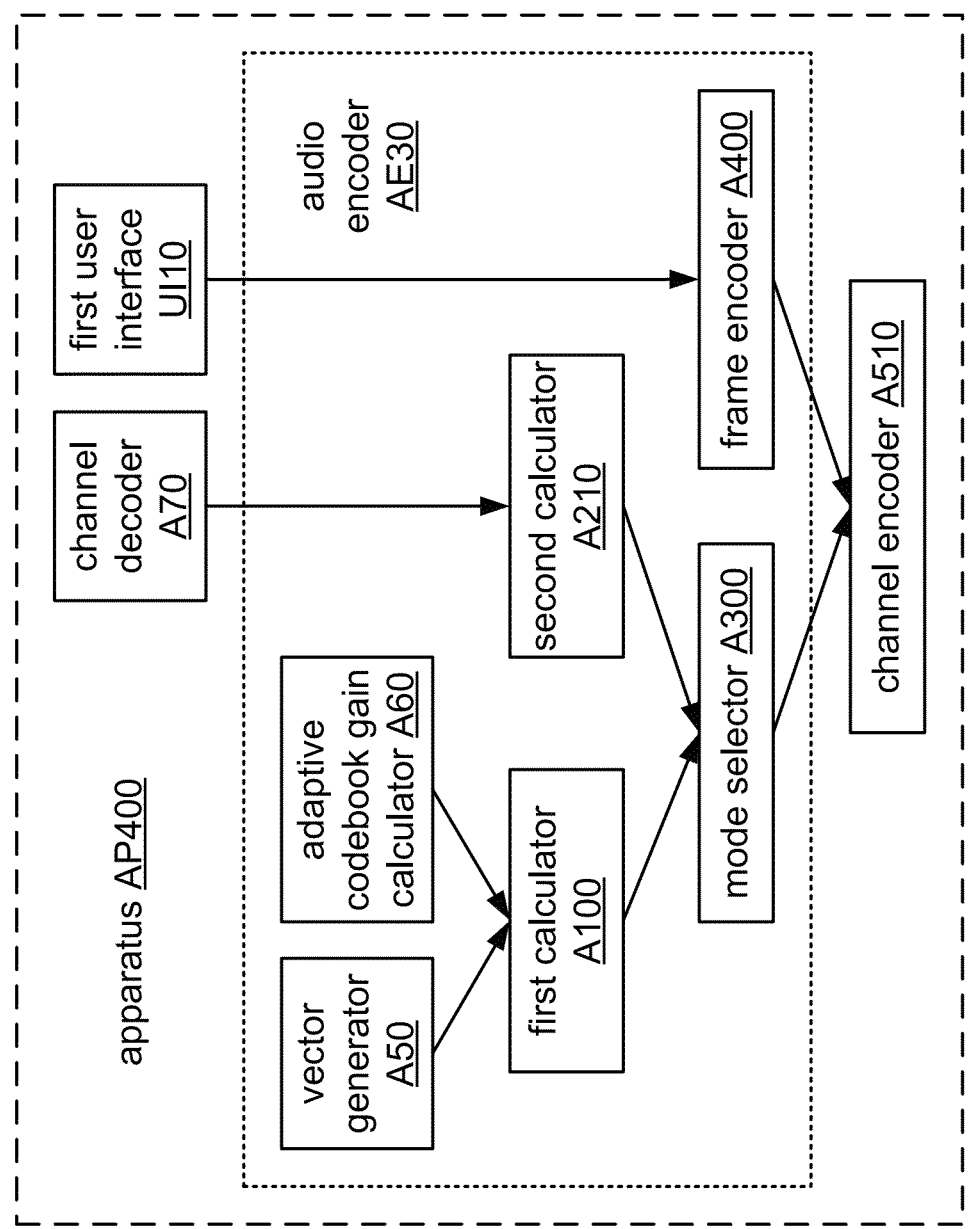
FIG. 19 shows a block diagram of an implementation AP400 of apparatus AP300.

FIG. 18A shows a block diagram of an implementation AP300 of apparatus AP110, AP120, and AP210. FIG. 19 shows a block diagram of an implementation AP400 of apparatus AP300 that includes an instance of first user interface UI10 and an implementation AE30 of audio encoder AE10 (e.g., of audio encoder AE20) that includes an instance of apparatus AP110 and is arranged to compress audio information from interface UI10. In this case, frame encoder A400 may be configured to select the size of the redundant copy or to receive an indication of the size from another module of audio encoder AE30 that is configured to perform such a selection (e.g., as described herein with reference to task T400).

Figure 9C:
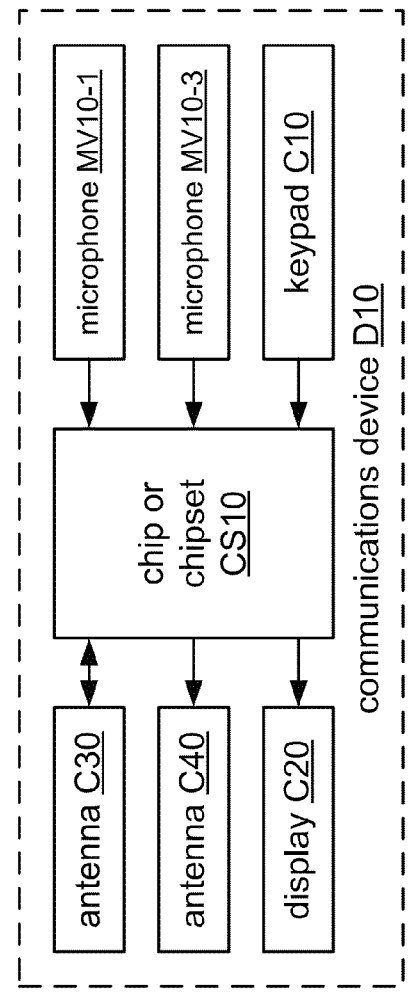
FIG. 9C shows a block diagram of a communications device D10.

FIG. 9C shows a block diagram of a communications device D10 that includes a chip or chipset CS10 (e.g., a mobile station modem (MSM) chipset) that may be implemented to embody the elements of any one or more of the implementations of apparatus AP100 (or MF100) as described herein. Chip/chipset CS10 may include one or more processors, which may be configured to execute a software and/or firmware part of apparatus A100 or MF100 (e.g., as instructions). Transmitting terminal 102 may be realized as an implementation of device D 10.

Chip/chipset CS10 includes a radio receiver (e.g., an implementation of RX10), which is configured to receive a radio-frequency (RF) communications signal and to decode and reproduce an audio signal (and channel state information) encoded within the RF signal, and a radio transmitter (e.g., an implementation of TX10), which is configured to transmit an encoded audio signal (e.g., as produced by task T500) which is based on audio information received via microphone MV10-1 and/or MV10-3 (e.g., as described herein with reference to first user interface UI10) into a transmission channel as an RF communications signal that describes the encoded audio signal. Such a device may be configured to transmit and receive voice communications data wirelessly via any one or more of the codecs referenced herein.

Device D10 is configured to receive and transmit the RF communications signals via an antenna C30. Device D10 may also include a diplexer and one or more power amplifiers in the path to antenna C30. Chip/chipset CS 10 is also configured to receive user input via keypad C10 and to display information via display C20. In this example, device D10 also includes one or more antennas C40 to support Global Positioning System (GPS) location services and/or short-range communications with an external device such as a wireless (e.g., Bluetooth™) headset. In another example, such a communications device is itself a Bluetooth™ headset and lacks keypad C10, display C20, and antenna C30.

Figure 20:
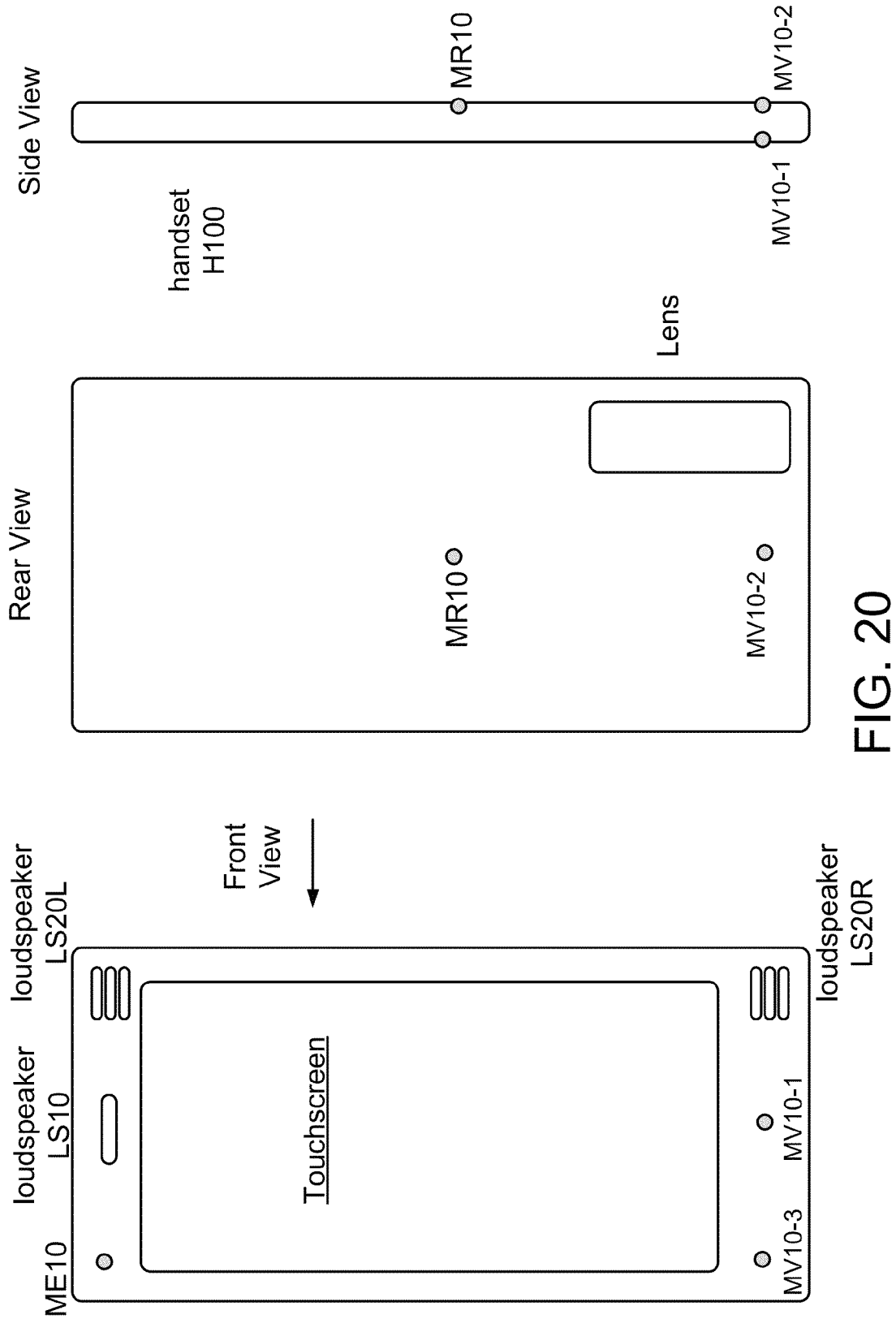
FIG. 20 shows front, rear, and side views of a handset H100.

Communications device D10 may be embodied in a variety of communications devices, including smartphones and laptop and tablet computers. FIG. 20 shows front, rear, and side views of one such example: a handset H100 (e.g., a smartphone) having two voice microphones MV10-1 and MV10-3 arranged on the front face, a voice microphone MV10-2 arranged on the rear face, another microphone ME10 (e.g., for enhanced directional selectivity and/or to capture acoustic error at the user's ear for input to an active noise cancellation operation) located in a top corner of the front face, and another microphone MR10 (e.g., for enhanced directional selectivity and/or to capture a background noise reference) located on the back face. A loudspeaker LS10 is arranged in the top center of the front face near error microphone ME10, and two other loudspeakers LS20L, LS20R are also provided (e.g., for speakerphone applications). A maximum distance between the microphones of such a handset is typically about ten or twelve centimeters.

FIG. 18B shows a block diagram of a wireless device 1102 may be implemented to perform a method as described herein (e.g., any one or more of methods M100, M110, M120, M200, M210, and M300). Transmitting terminal 102 may be realized as an implementation of wireless device 1102. Wireless device 1102 may be a remote station, access terminal, handset, personal digital assistant (PDA), cellular telephone, etc.

Wireless device 1102 includes a processor 1104 which controls operation of the device. Processor 1104 may also be referred to as a central processing unit (CPU). Memory 1106, which may include both read-only memory (ROM) and random access memory (RAM), provides instructions and data to processor 1104. A portion of memory 1106 may also include non-volatile random access memory (NVRAM). Processor 1104 typically performs logical and arithmetic operations based on program instructions stored within memory 1106. The instructions in memory 1106 may be executable to implement the method or methods as described herein.

Wireless device 1102 includes a housing 1108 that may include a transmitter 1110 and a receiver 1112 to allow transmission and reception of data between wireless device 1102 and a remote location. Transmitter 1110 and receiver 1112 may be combined into a transceiver 1114. An antenna 1116 may be attached to the housing 1108 and electrically coupled to the transceiver 1114. Wireless device 1102 may also include (not shown) multiple transmitters, multiple receivers, multiple transceivers and/or multiple antennas.

In this example, wireless device 1102 also includes a signal detector 1118 that may be used to detect and quantify the level of signals received by transceiver 1114. Signal detector 1118 may detect such signals as total energy, pilot energy per pseudonoise (PN) chips, power spectral density, and other signals. Wireless device 1102 also includes a digital signal processor (DSP) 1120 for use in processing signals.

The various components of wireless device 1102 are coupled together by a bus system 1122 which may include a power bus, a control signal bus, and a status signal bus in addition to a data bus. For the sake of clarity, the various busses are illustrated in FIG. 18B as the bus system 1122.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any among apparatus MF100, MF110, MF120, MF200, MF210, MF300, AP100, AP110, AP120, AP200, AP210, AP300, and AP400) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., any among apparatus MF100, MF110, MF120, MF200, MF210, MF300, AP100, AP110, AP120, AP200, AP210, AP300, and AP400) may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., any among methods M100, M110, M120, M200, M210, and M300) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, non-volatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The invention claimed is:

1. A method of audio signal processing, said method comprising:
   based on information about a first frame of the audio signal, calculating a criticality measure;
   based on information relating to a state of a transmission channel, calculating a threshold value;
   comparing the calculated criticality measure to the calculated threshold value;
   based on a result of said comparing, deciding to transmit a redundant copy of the first frame; and
   transmitting the redundant copy of the first frame with a second frame, wherein the first frame precedes the second frame in the audio signal.

2. The method according to claim 1, wherein said criticality measure is an estimate of coding dependence of a dependent frame on the first frame.

3. The method according to claim 2, wherein said method includes using the information about the first frame to generate an adaptive codevector, and wherein said criticality measure is based on information from the adaptive codevector.

4. The method according to claim 1, wherein said calculated criticality measure is based on information about an encoded version of a dependent frame.

5. The method according to claim 1, wherein said calculated criticality measure is based on an adaptive codebook gain value of an encoded version of a dependent frame.

6. The method according to claim 1, wherein said calculated criticality measure is based on information about a first encoded version of a dependent frame and on information about a second encoded version of the dependent frame, wherein the first encoded version is encoded using information about an encoded version of the first frame, and wherein the second encoded version is encoded without using said information about the encoded version of the first frame.

7. The method according to claim 1, wherein said information relating to the state of the transmission channel includes a number of packets lost, and wherein said calculated threshold value is based on said number of packets lost.

8. The method according to claim 1, wherein said information relating to the state of the transmission channel includes a jitter value that is based on transit times of received packets, and wherein said calculated threshold value is based on said jitter value.

9. The method according to claim 1, wherein said method includes receiving the information relating to the state of the transmission channel via a wireless transmission channel.

10. The method according to claim 1, wherein said calculating the threshold value comprises enforcing a minimum value on the calculated threshold value.

11. The method according to claim 1, wherein said calculating the threshold value comprises:
    comparing a calculated value that is based on the information relating to the state of the transmission channel to a boundary value; and
    in response to a result of said comparing to the boundary value, selecting the boundary value as the calculated threshold value.

12. The method according to claim 1, wherein said method comprises:
    encoding the first frame to produce a primary copy of the first frame;
    producing the redundant copy of the first frame; and
    producing an encoded signal that includes the primary copy and the redundant copy.

13. The method according to claim 12, wherein the primary copy of the first frame includes a first codeword that indicates a position for each of a total number P1 of unit pulses of a first algebraic codevector of length L, and wherein the redundant copy of the first frame includes a second codeword that indicates a position for each of a total number P2 of unit pulses of a second algebraic codevector of length L, and wherein P1 is greater than P2.

14. The method according to claim 12, wherein said producing the encoded signal comprises:
    producing a first packet that includes the primary copy of the first frame; and
    in response to said deciding, producing a second packet that includes the redundant copy of the first frame and a copy of the second frame, and
    wherein the encoded signal includes the first and second packets.

15. The method according to claim 12, wherein said method includes transmitting the encoded signal into the transmission channel.

16. The method according to claim 1, wherein said method includes determining the value of an offset that indicates a total number of frames of the audio signal between the first frame and the second frame.

17. The method according to claim 1, wherein said calculating the threshold value comprises:
    based on the information relating to the state of the transmission channel, calculating a first threshold value and a second threshold value; and
    based on information from at least one among the first frame and a frame adjacent to the first frame in the audio signal, selecting the calculated threshold value from among the first and second threshold values.

18. An apparatus for audio signal processing, said apparatus comprising:
    means for calculating a criticality measure based on information about a first frame of the audio signal;
    means for calculating a threshold value, based on information relating to a state of a transmission channel;
    means for comparing the calculated criticality measure to the calculated threshold value;
    means for deciding to transmit a redundant copy of the first frame, based on a result of said comparing; and means for transmitting the redundant copy of the first frame with a second frame, wherein the first frame precedes the second frame in the audio signal.

19. The apparatus according to claim 18, wherein said criticality measure is an estimate of coding dependence of a dependent frame on the first frame.

20. The apparatus according to claim 19, wherein said apparatus includes means for using the information about the first frame to generate an adaptive codevector, and wherein said criticality measure is based on information from the adaptive codevector.

21. The apparatus according to claim 18, wherein said calculated criticality measure is based on information about an encoded version of a dependent frame.

22. The apparatus according to claim 18, wherein said calculated criticality measure is based on an adaptive codebook gain value of an encoded version of a dependent frame.

23. The apparatus according to claim 18, wherein said calculated criticality measure is based on information about a first encoded version of a dependent frame and on information about a second encoded version of the dependent frame, wherein the first encoded version is encoded using information about an encoded version of the first frame, and wherein the second encoded version is encoded without using said information about the encoded version of the first frame.

24. The apparatus according to claim 18, wherein said information relating to the state of the transmission channel includes a number of packets lost, and wherein said calculated threshold value is based on said number of packets lost.

25. The apparatus according to claim 18, wherein said information relating to the state of the transmission channel includes a jitter value that is based on transit times of received packets, and wherein said calculated threshold value is based on said jitter value.

26. The apparatus according to claim 18, wherein said apparatus includes means for receiving the information relating to the state of the transmission channel via a wireless transmission channel.

27. The apparatus according to claim 18, wherein said means for calculating the threshold value is configured to enforce a minimum value on the calculated threshold value.

28. The apparatus according to claim 18, wherein said means for calculating the threshold value comprises:
means for comparing a calculated value that is based on the information relating to the state of the transmission channel to a boundary value; and
means for selecting the boundary value as the calculated threshold value, in response to a result of said comparing to the boundary value.

29. The apparatus according to claim 18, wherein said apparatus comprises:
means for encoding the first frame to produce a primary copy of the first frame;
means for producing the redundant copy of the first frame; and
means for producing an encoded signal that includes the primary copy and the redundant copy.

30. The apparatus according to claim 29, wherein the primary copy of the first frame includes a first codeword that indicates a position for each of a total number P1 of unit pulses of a first algebraic codevector of length L, and wherein the redundant copy of the first frame includes a second codeword that indicates a position for each of a total number P2 of unit pulses of a second algebraic codevector of length L, and wherein P1 is greater than P2.

31. The apparatus according to claim 29, wherein said means for producing the encoded signal comprises:
means for producing a first packet that includes the primary copy of the first frame; and
means for producing a second packet that includes the redundant copy of the first frame and a copy of the second frame, in response to said deciding, and
wherein the encoded signal includes the first and second packets.

32. The apparatus according to claim 29, wherein said apparatus includes means for transmitting the encoded signal into the transmission channel.

33. The apparatus according to claim 18, wherein said apparatus includes means for determining the value of an offset that indicates a total number of frames of the audio signal between the first frame and the second frame.

34. The apparatus according to claim 18, wherein said means for calculating the threshold value comprises:
means for calculating, based on the information relating to the state of the transmission channel, a first threshold value and a second threshold value; and
means for selecting the calculated threshold value from among the first and second threshold values, based on information from at least one among the first frame and a frame adjacent to the first frame in the audio signal.

35. An apparatus for audio signal processing, said apparatus comprising:
a first calculator configured to calculate a criticality measure based on information about a first frame of the audio signal;
a second calculator configured to calculate a threshold value, based on information relating to a state of a transmission channel;
a mode selector configured (A) to compare the calculated criticality measure to the calculated threshold value and (B) to decide to transmit a redundant copy of the first frame, based on a result of said comparing; and
a transmitter configured to transmit the redundant copy of the first frame with a second frame, wherein the first frame precedes the second frame in the audio signal.

36. The apparatus according to claim 35, wherein said criticality measure is an estimate of coding dependence of a dependent frame on the first frame.

37. The apparatus according to claim 36, wherein the information from the first frame includes an excitation signal, and wherein said apparatus includes a vector generator configured to use information about the excitation signal to produce an adaptive codevector, and wherein said calculated criticality measure is based on the adaptive codevector.

38. The apparatus according to claim 35, wherein said calculated criticality measure is based on information about an encoded version of a dependent frame.

39. The apparatus according to claim 35, wherein said calculated criticality measure is based on an adaptive codebook gain value of an encoded version of a dependent frame.

40. The apparatus according to claim 35, wherein said calculated criticality measure is based on information about a first encoded version of a dependent frame and on information about a second encoded version of the dependent frame, wherein the first encoded version is encoded using information about an encoded version of the first frame, and wherein the second encoded version is encoded without using said information about the encoded version of the first frame.

41. The apparatus according to claim 35, wherein said information relating to the state of the transmission channel includes a number of packets lost, and wherein said calculated threshold value is based on said number of packets lost.

42. The apparatus according to claim 35, wherein said information relating to the state of the transmission channel includes a jitter value that is based on transit times of received packets, and wherein said calculated threshold value is based on said jitter value.

43. The apparatus according to claim 35, wherein said apparatus includes a channel decoder configured to receive the information relating to the state of the transmission channel via a wireless transmission channel.

44. The apparatus according to claim 35, wherein said second calculator is configured to enforce a minimum value on the calculated threshold value.

45. The apparatus according to claim 35, wherein said second calculator comprises:
   a comparator configured to compare a calculated value that is based on the information relating to the state of the transmission channel to a boundary value; and
   a selector configured to select the boundary value as the calculated threshold value, in response to a result of said comparing to the boundary value.

46. The apparatus according to claim 35, wherein said apparatus comprises:
   a frame encoder configured to encode the first frame to produce (A) a primary copy of the first frame and (B) the redundant copy of the first frame; and
   a channel encoder configured to produce an encoded signal that includes the primary copy and the redundant copy.

47. The apparatus according to claim 46, wherein the primary copy of the first frame includes a first codeword that indicates a position for each of a total number P1 of unit pulses of a first algebraic codevector of length L, and wherein the redundant copy of the first frame includes a second codeword that indicates a position for each of a total number P2 of unit pulses of a second algebraic codevector of length L, and wherein P1 is greater than P2.

48. The apparatus according to claim 46, wherein said channel encoder comprises a packet assembler configured to produce (A) a first packet that includes the primary copy of the first frame and (B) a second packet that includes the redundant copy of the first frame and a copy of the second frame, and wherein the encoded signal includes the first and second packets.

49. The apparatus according to claim 46, wherein said apparatus includes a radio transmitter configured to transmit the encoded signal into the transmission channel.

50. The apparatus according to claim 35, wherein said apparatus includes an offset calculator configured to determine the value of an offset that indicates a total number of frames of the audio signal between the first frame and the second frame.

51. The apparatus according to claim 35, wherein said second calculator comprises:
   a threshold value calculator configured to calculate, based on the information relating to the state of the transmission channel, a first threshold value and a second threshold value; and
   a threshold value selector configured to select the calculated threshold value from among the first and second threshold values, based on information from at least one among the first frame and a frame adjacent to the first frame in the audio signal.

52. A non-transitory computer-readable data storage medium having tangible features that cause a machine reading the features to:
   calculate a criticality measure based on information about a first frame of the audio signal;
   calculate a threshold value, based on information relating to a state of a transmission channel;
   compare the calculated criticality measure to the calculated threshold value;
   decide to transmit a redundant copy of the first frame, based on a result of said comparing; and
   transmit the redundant copy of the first frame with a second frame, wherein the first frame precedes the second frame in the audio signal.

* * * * *